(12) United States Patent
Ohshima

(10) Patent No.: US 8,072,621 B2
(45) Date of Patent: Dec. 6, 2011

(54) IMAGE PROCESSING APPARATUS AND IMAGE PROCESSING METHOD

(75) Inventor: Keita Ohshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1168 days.

(21) Appl. No.: 10/725,026

(22) Filed: Dec. 2, 2003

(65) Prior Publication Data

US 2004/0109191 A1 Jun. 10, 2004

(30) Foreign Application Priority Data

Dec. 6, 2002 (JP) ................................. 2002-355478

(51) Int. Cl.
- G06F 3/12 (2006.01)
- G06F 15/00 (2006.01)
- G06K 15/00 (2006.01)

(52) U.S. Cl. ..................... 358/1.13; 358/1.18; 358/1.9

(58) Field of Classification Search ................. None
See application file for complete search history.

(56) References Cited

U.S. PATENT DOCUMENTS

| | | | | |
|---|---|---|---|---|
| 5,973,802 A * | 10/1999 | Hirota et al. | ............... | 358/521 |
| 6,335,795 B1 | 1/2002 | Neuhard et al. | | |
| 6,727,999 B1 * | 4/2004 | Takahashi | ............... | 358/1.15 |
| 6,874,034 B1 * | 3/2005 | Hertling | ............... | 709/245 |
| 6,985,245 B1 * | 1/2006 | Takahashi | ............... | 358/1.15 |
| 6,995,860 B2 * | 2/2006 | Roztocil et al. | ............... | 358/1.18 |
| 2001/0043346 A1 | 11/2001 | Roztocil et al. | | |
| 2002/0041392 A1 | 4/2002 | Tokura | | |

FOREIGN PATENT DOCUMENTS

| | | |
|---|---|---|
| EP | 0529808 | 3/1993 |
| EP | 1197837 | 4/2002 |
| JP | 7-186457 | 7/1995 |
| JP | 8-249139 | 9/1996 |
| JP | 11-338664 | 12/1999 |
| JP | 2001-084245 | 3/2001 |
| JP | 2002-169682 | 6/2002 |
| WO | 0131432 | 5/2001 |

OTHER PUBLICATIONS

Search report, dated Nov. 15, 2007, in EP 03257615.

* cited by examiner

*Primary Examiner* — David K Moore
*Assistant Examiner* — Marcus T Riley
(74) *Attorney, Agent, or Firm* — Fitzpatrick, Cella, Harper & Scinto

(57) ABSTRACT

An information managing apparatus which is connected to an information processing apparatus and image processing apparatuses has: receiving means for receiving a print document and an instruction manual from the information processing apparatus, in which layout information of the print document and attribute information of each of the layout information are included in the instruction manual; and selecting means for selecting the image processing apparatuses to which the arranged print document should be outputted on the basis of the instruction manual.

5 Claims, 20 Drawing Sheets

FIG. 5

```
1  <JobTicket>
2    <Document FileName="sample.pdf" Amount="10"/>
3    <Media PaperSize="A4"/>
4    <Layout ColorFlag="true">
5      <Sheet ColorFlag="false">
6        <Surface Side="Front" ColorFlag="false">
7          <Content Page="0" Position="0 0" Scale="0.7" ColorFlag="false"/>
8          <Content Page="1" Position="400 0" Scale="0.7" ColorFlag="false"/>
9        </Surface>
10     </Sheet >
11     <Sheet ColorFlag="true">
12       <Surface Side="Front" ColorFlag="true">
13         <Content Page="2" Position="0 0" Scale="0.7" ColorFlag="false">
14           <Annotation ImageFile="maruhi.img" Position="0 0" ColorFlag="true"/>
15         </Content>
16         <Content Page="3" Position="400 0" Scale="0.7" ColorFlag="false"/>
17       </Surface>
18     </Sheet >
19     <Sheet ColorFlag="true">
20       <Surface Side="Front" ColorFlag="true">
21         <Content Page="4" Position="0 0" Scale="0.7" ColorFlag="false"/>
22         <Content Page="5" Position="400 0" Scale="0.7" ColorFlag="false">
23           <Annotation ImageFile="maruhi.img" Position="0 0" ColorFlag="true"/>
24         </Content>
25       </Surface>
26     </Sheet >
27     <Sheet ColorFlag="false">
28       <Surface Side="Front" ColorFlag="false">
29         <Content Page="6" Position="0 0" Scale="0.7" ColorFlag="false"/>
30         <Content Page="7" Position="400 0" Scale="0.7" ColorFlag="false"/>
31       </Surface>
32     </Sheet >
33     <Sheet ColorFlag="true">
34       <Surface Side="Front" ColorFlag="true">
35         <Content Page="8" Position="0 0" Scale="0.7" ColorFlag="false">
36           <Annotation ImageFile="maruhi.img" Position="0 0" ColorFlag="true"/>
37         </Content>
38         <Content Page="9" Position="400 0" Scale="0.7" ColorFlag="false"/>
39       </Surface>
40     </Sheet >
41   </Layout>
42 </JobTicket>
```

FIG. 12

```
1  <JobTicket>
2   <Document FileName="sample.pdf" Amount="10"/>
3   <Media PaperSize="A4"/>
4   <Layout ColorFlag="true">
5    <Sheet ColorFlag="true">
6     <Surface Side="Front" ColorFlag="false">
7      <Content Page="0" Position="0 0" Scale="0.7" ColorFlag="false"/>
8      <Content Page="1" Position="400 0" Scale="0.7" ColorFlag="false"/>
9     </Surface>
10    <Surface Side="Back" ColorFlag="true">
11     <Content Page="2" Position="0 0" Scale="0.7" ColorFlag="false">
12      <Annotation ImageFile="maruhi.img" Position="0 0" ColorFlag="true"/>
13     </Content>
14     <Content Page="3" Position="400 0" Scale="0.7" ColorFlag="false"/>
15    </Surface>
16   </Sheet >
17   <Sheet ColorFlag="true">
18    <Surface Side="Front" ColorFlag="true">
19     <Content Page="4" Position="0 0" Scale="0.7" ColorFlag="false"/>
20     <Content Page="5" Position="400 0" Scale="0.7" ColorFlag="false">
21      <Annotation ImageFile="maruhi.img" Position="0 0" ColorFlag="true"/>
22     </Content>
23    </Surface>
24    <Surface Side="Back" ColorFlag="false">
25     <Content Page="6" Position="0 0" Scale="0.7" ColorFlag="false"/>
26     <Content Page="7" Position="400 0" Scale="0.7" ColorFlag="false"/>
27    </Surface>
28   </Sheet >
29   <Sheet ColorFlag="true">
30    <Surface Side="Front" ColorFlag="true">
31     <Content Page="8" Position="0 0" Scale="0.7" ColorFlag="false">
32      <Annotation ImageFile="maruhi.img" Position="0 0" ColorFlag="true"/>
33     </Content>
34     <Content Page="9" Position="400 0" Scale="0.7" ColorFlag="false"/>
35    </Surface>
36   </Sheet >
37  </Layout>
38 </JobTicket>
```

FIG. 16

```
1  <JobTicket>
2    <Document FileName="sample.pdf" Amount="10"/>
3    <Media PaperSize="A4"/>
4    <Layout ColorFlag="false">
5      <Sheet ColorFlag="false">
6        <Surface Side="Front" ColorFlag="false">
7          <Content Page="0" Position="0 0" Scale="0.7" ColorFlag="false"/>
8          <Content Page="1" Position="400 0" Scale="0.7" ColorFlag="false"/>
9        </Surface>
10     </Sheet >
11     <Sheet ColorFlag="false">
12       <Surface Side="Front" ColorFlag="false">
13         <Content Page="2" Position="0 0" Scale="0.7" ColorFlag="false"/>
14         <Content Page="3" Position="400 0" Scale="0.7" ColorFlag="false"/>
15       </Surface>
16     </Sheet >
17     <Sheet ColorFlag="false">
18       <Surface Side="Front" ColorFlag="false">
19         <Content Page="4" Position="0 0" Scale="0.7" ColorFlag="false"/>
20         <Content Page="5" Position="400 0" Scale="0.7" ColorFlag="false"/>
21       </Surface>
22     </Sheet >
23     <Sheet ColorFlag="false">
24       <Surface Side="Front" ColorFlag="false">
25         <Content Page="6" Position="0 0" Scale="0.7" ColorFlag="false"/>
26         <Content Page="7" Position="400 0" Scale="0.7" ColorFlag="false"/>
27       </Surface>
28     </Sheet >
29     <Sheet ColorFlag="false">
30       <Surface Side="Front" ColorFlag="false">
31         <Content Page="8" Position="0 0" Scale="0.7" ColorFlag="false"/>
32         <Content Page="9" Position="400 0" Scale="0.7" ColorFlag="false"/>
33       </Surface>
34     </Sheet >
35   </Layout>
36 </JobTicket>
```

IMAGE PROCESSING APPARATUS AND IMAGE PROCESSING METHOD

BACKGROUND OF THE INVENTION

1. Field of the Invention

The invention relates to an image processing apparatus and an image processing method.

2. Related Background Art

Hitherto, to print a document, a target document and a print instruction are inputted to an apparatus and the document is printed. In this instance, operations such that contents to instruct a printing method such as a duplex-mode instruction are held by a document different from a print target and a pair of such contents and the print target is inputted to the apparatus are also executed. The document including the instruction contents is called an instruction manual or a job ticket (JobTicket). By using the job ticket, it is possible to store the complicated instruction contents and easily repeat printing by the same printing method. By using the job ticket, the user can request a product in a final state (for example, "a book in a book-binding state") irrespective of the existence of an apparatus for actually executing the printing or functions of the apparatus.

As another prior art, in order to obtain one product, processes such that the printing is simultaneously executed by a plurality of apparatuses, their outputs are finally collected, and the product is formed are also executed. For example, in the case of outputting a plurality of copies, those copies are divided to a plurality of apparatuses and the same copy is outputted thereto or the copy is divided into page ranges and distributed to the plurality of apparatuses or the like. Further, there is also a case of dividing the distribution contents in accordance with a type of apparatus. A process in which such a technique is most effectively used in a system of a small scale constructed by an office printer or the like is a color distribution printing process such that black and white (monochromatic) printing and full-color printing are separately executed and, thereafter, printed pages are collected to one page. Ordinarily, since there are differences in throughputs and running costs between a monochromatic printing apparatus and a color printing apparatus, an advantage in terms of a speed and costs which are obtained by respectively printing a monochromatic page and a full-color page by the proper apparatuses is large.

Usually, in the distribution printing process as mentioned above, a special instruction for the distribution printing is not always described in the job ticket itself. This is because if the final product is an object, distributing means is not always information that is necessary for the job ticket and, in the case of the job ticket in which the number of copies or the page range is specifically divided and instructed for the purpose of distributing, printing processes other than the distribution printing process cannot be executed.

There is also a technique such that when the techniques (the print instruction by the job ticket and the color page discrimination distribution printing) as mentioned above are combined, information regarding a color drawing object is held in the job ticket in order to efficiently divide the print instruction. Thus, the color page and the monochromatic page can be discriminated even if page data or image data expressed by a page description language are not analyzed. Even if the job ticket is transferred to a system which does not perform the distribution printing, the processes can be progressed without forcing the distribution printing.

Among the job tickets, there is also a job ticket which instructs editing for performing a page layout of the original page data onto an output page. For example, there are "nUp" printing for arranging a plurality of pages of original data onto one output page and the like. Specifically speaking, there are "2in1" in which every two pages are reduced and arranged onto one page, "4in1" in which every four pages are reduced and arranged onto one page, and the like.

According to such a page layout instruction job ticket, there is a possibility that when reprinting is executed by such a job ticket, the page layout method is finely adjusted. For example, there is a situation such that when the reprinting is executed by using a job ticket for performing the page layout to one-side, the page layout is changed to the both-side layout and print data is outputted. The reason why the same job ticket is used in spite of the fact that the instruction of the job ticket is edited again (instruction contents are changed) is because in the case where the user wants to set all instructions other than the page layout instruction to the same condition, the job ticket is used as the basis for the instruction contents.

In such a situation, if information regarding the color drawing object is held in the job ticket, color information of all pages has to be updated in association with the change in page layout, so that a merit which is obtained when the job ticket is used decreases again to the half.

From the reasons as mentioned above, in the system using the job ticket including the page layout instruction, there is a problem such that in a color page discriminating process in the distribution print system, it is difficult to realize high efficiency by holding the information into the job ticket.

SUMMARY OF THE INVENTION

The invention is made to solve the foregoing problems in the conventional system and it is an object of the invention to provide a print management system in which proper page distribution printing can be executed in a state where different printing apparatuses which can perform color printing or monochromatic printing while a printing process is executed in accordance with an instruction of a job ticket including a page layout instruction, wherein an optimum one of the color printing and the monochromatic printing is efficiently determined without analyzing detailed data of page information serving as a print target.

To accomplish the above object, according to the invention, there is provided an information managing apparatus which is connected to an information processing apparatus and image processing apparatuses, comprising: receiving means for receiving a print document and an instruction manual from the information processing apparatus, in which layout information of the print document and attribute information of each of the layout information are included in the instruction manual; and selecting means for selecting the image processing apparatuses to which the arranged print document should be outputted on the basis of the instruction manual.

Further other functions and features of the present invention will become apparent from the following detailed description and the appended claims with reference to the accompanying drawings.

BRIEF DESCRIPTION OF THE DRAWINGS

FIG. 5 is a diagram showing an example of a job ticket;

FIG. 12 is a diagram showing an example of a job ticket obtained after editing in the first embodiment;

FIG. 16 is a diagram showing an example of a job ticket obtained after editing in the second embodiment;

DETAILED DESCRIPTION OF THE PREFERRED EMBODIMENTS

Embodiments of the invention will be described in detail hereinbelow with reference to the drawings.

First Embodiment

Figure 1:
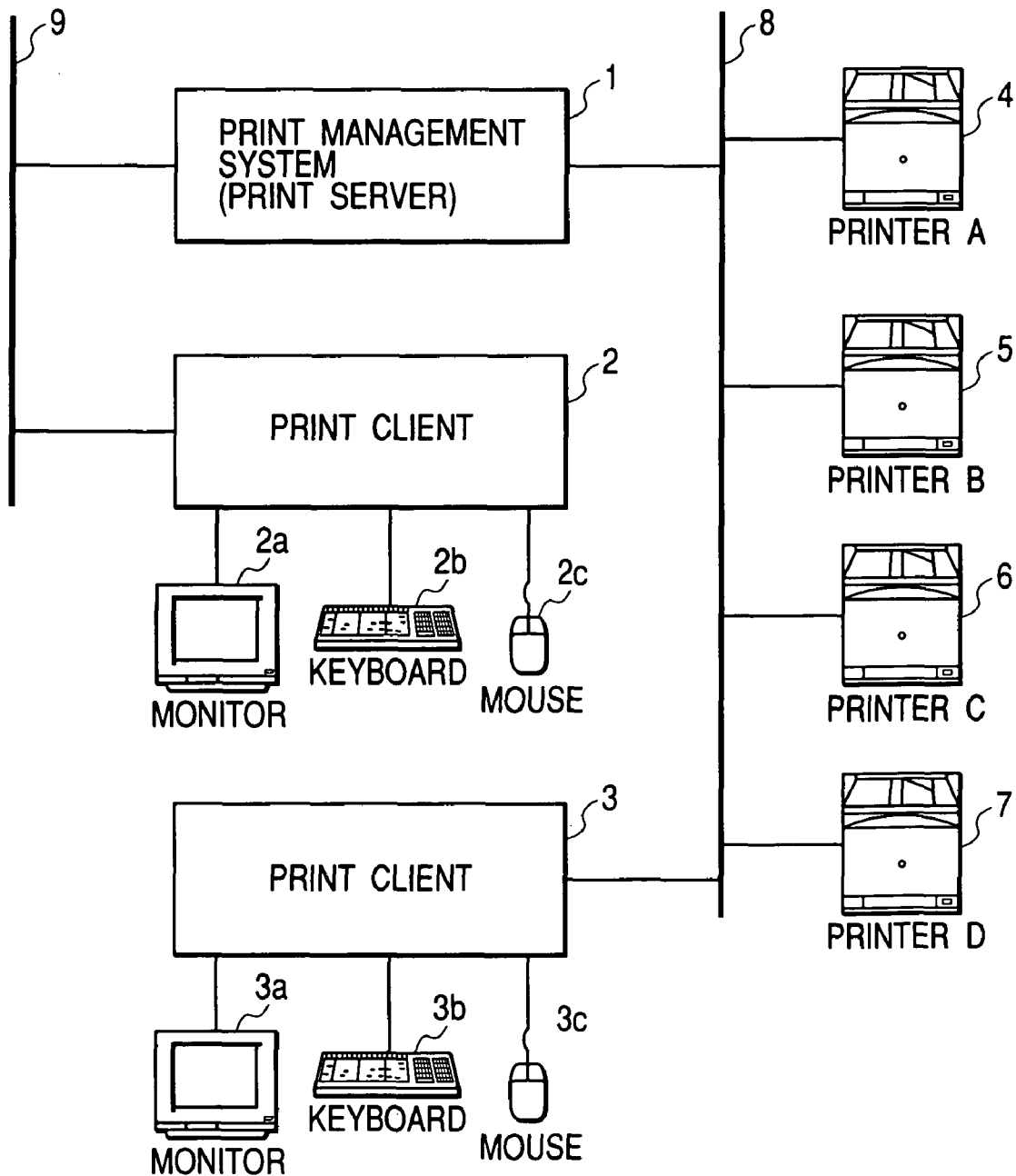
FIG. 1 is a block diagram showing a whole construction of a print management system.

FIG. 1 is a block diagram showing a whole construction of a print management system according to an embodiment of the invention. In FIG. 1, reference numeral 1 denotes a print server for managing printers; 2 a print client for transmitting a print document and a job ticket to the print server 1; 3 similarly a print client; 4 to 7 printers which are managed by the print server 1; 8 a network for connecting the print server 1, the print client 3, and the printers (4 to 7); and 9 a network for connecting the print server 1 and the print client 2. A monitor 2a, a keyboard 2b, and a mouse 2c are connected to the print client 2. Similarly, a monitor 3a, a keyboard 3b, and a mouse 3c are connected to the print client 3. By using those input/output apparatuses, a print instruction can be transmitted from the print client 2 or the print client 3 to the print server 1.

The user of the print client 2 operates the keyboard 2b and the mouse 2c while confirming an output of the monitor 2a and sends an instruction to the print server 1 via the network 9. At this time, the print document and the job ticket are also transmitted via the network 9.

The user of the print client 3 operates the keyboard 3b and the mouse 3c while confirming an output of the monitor 3a and sends an instruction to the print server 1 via the network 8. At this time, the print document and the job ticket are also transmitted via the network 8.

The print server 1 which received the print instruction from the print client 2 or the print client 3 selects a device for printing in accordance with predetermined conditions shown in the instruction from the print client and outputs the print document in accordance with an instruction of the job ticket. At this time, the device for printing is selected from the printers A (4) to D (7).

Although the whole construction of the print management system is as shown in FIG. 1, the print server 1 has a central function of the system and there is also a case where the print server 1 is called a print management system.

In FIG. 1, although each of the printers A (4) to D (7) is an apparatus which can execute the printing operation independently, by being concentratedly managed by the print server 1, they are efficiently combined and used or they are properly selected every print job, so that the whole construction including the print server 1 can be regarded as one printer whose load has properly been distributed. It is assumed that the printers in the embodiment are devices each of which can interpret data in a PDF format and form an image.

Subsequently, it will be described how the print document and the job ticket are transmitted from the print client to the print server in the embodiment.

Figure 2:
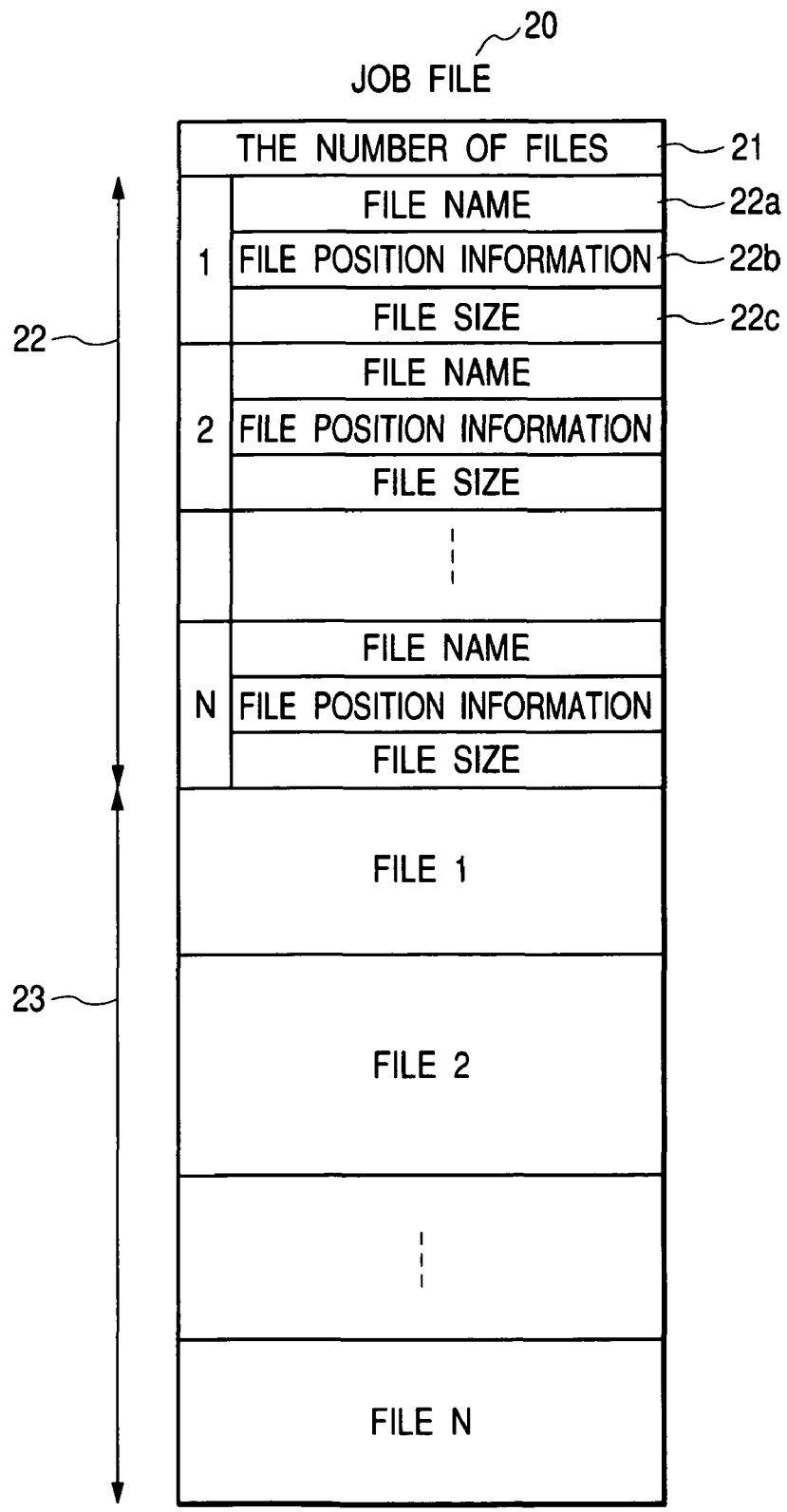
FIG. 2 is a diagram showing an example of a structure of a job file.

FIG. 2 is a diagram showing a structure of data of a print document file which is sent from the print client to the print server 1 via the network 8 or 9 in FIG. 1. In the embodiment, the print document and the job ticket are collected as one file and sent to the print server 1. In other words, the file which is sent to the print server 1 is a file obtained by collecting a plurality of files. A plurality of files which are collected denote one job ticket and one or more document files which are handled as targets by the job ticket. There can be also a case where an image data file is included in the document file mentioned here. In the embodiment, one file which is obtained by collecting the files and sent to the print server is called a job file.

In FIG. 2, reference numeral 20 denotes a job file. The job file 20 comprises mainly three portions. The number of files (21) included in the job file, file information (22), and substance data (23) are provided in order from the top. The file information 22 and the substance data 23 of the numbers shown by the number of files 21 exist. Each file information further comprises a file name 22a, file position information 22b, and a file size 22c and a set of those three data corresponds to one file. The file name 22a is a name of a file included in the job file and the job ticket and the document file are identified by this name. Further, it is assumed that also in the description in the job ticket, the document file is referred to by the file name. The file position information 22b is information showing in which portion of the substance data 23 the substance data of the corresponding file is located. The file size 22c is information showing a size of the corresponding file. The above data is simply coupled and constructed as one file and this file is the job file 20.

Each of the number of files 21, file name 22a, file position information 22b, and file size 22c has a data size of a fixed length. The substance data 23 has a data size of a variable length in accordance with the data of each file.

Figure 3:
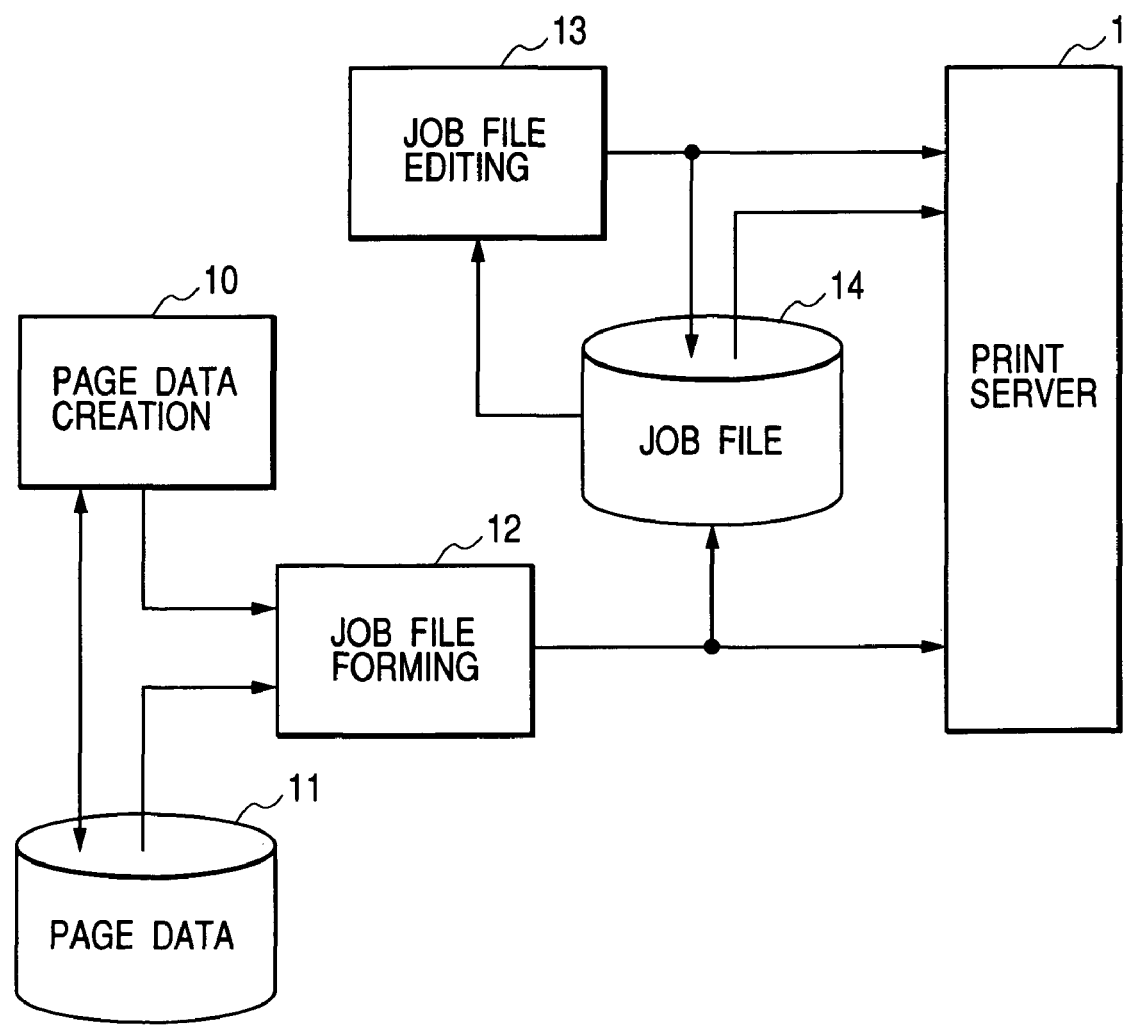
FIG. 3 is a flowchart for data of the job file.

FIG. 3 is a diagram showing a flow of the job file in a range from the creation of the job file to the arrival of the job file at the print server.

In FIG. 3, reference numeral 10 denotes a portion to form the page data, for example, a general document editing application or the like; 11 a storing device in which the page data has been stored; 12 a portion for forming the job file from the page data, for example, software having a format of a printer driver or the like; 13 a portion for editing the job file, that is, application software for editing the job file; 14 a storing device in which the job file has been stored; and 1 the print server similar to that shown in FIG. 1.

In FIG. 3, first, the general document editing application 10 edits the page data corresponding to the application and stores the page data into the storing device 11 as necessary. The page data stored in the storing device 11 is read out again by the document editing application 10 and edited again or copied.

The job file forming unit 12 receives the page data from the document editing application 10 or the storing device 11 and forms a job file corresponding to the received page data. The formed job file is sent to the print server 1 and a predetermined printing process is executed. In this instance, there is a case where the job file is sent to the print server 1 and, at the same time, the same job file is also stored into the storing device 14.

There is a case where the job file stored in the storing device 14 is sent to the print server 1 again in order to reprint.

There is also a case where in the job file editing unit 13, the job file stored in the storing device 14 is read out, edited in order to finely adjust the print instruction and, thereafter, sent to the print server 1. At this time, there is also a case where the job file is sent to the print server 1 and, at the same time, the same job file is also stored into the storing device 14.

Figure 4:
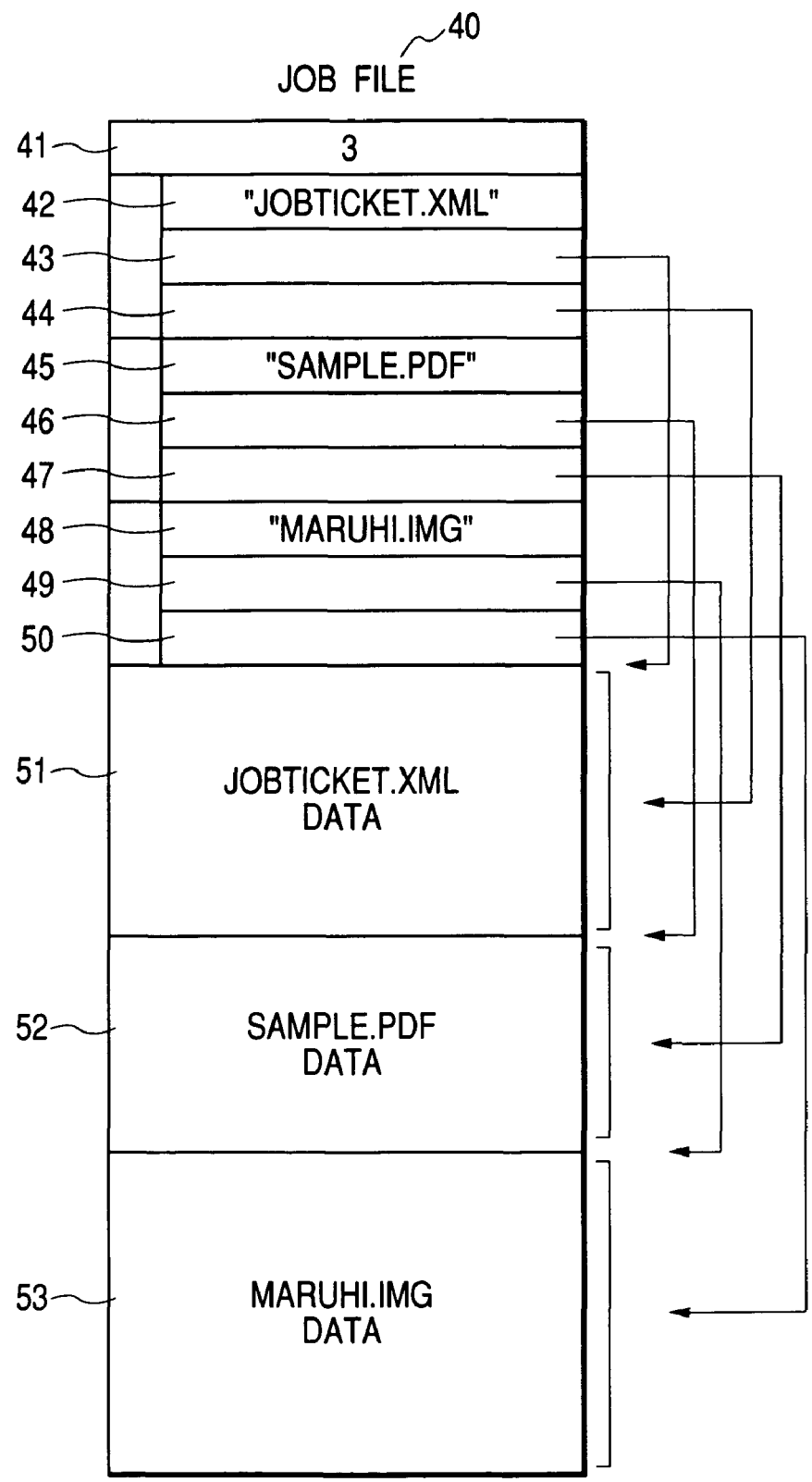
FIG. 4 is a diagram showing an example of a job file.

FIG. 4 is a diagram showing an example of the job file in the embodiment.

In FIG. 4, reference numeral 40 denotes a job file including one job ticket, one document file, and one image and 41 indicates the number of files included in the job file. There are a total of three files comprising the job ticket, document file, and image file.

Reference numeral 42 denotes a file name of the job ticket as the first file. In the embodiment, the file name is "JobTicket.xml". Reference numeral 43 denotes position information showing in which position in the job file 40 "JobTicket.xml" is located. The position shown by an arrow from the position information 43 in FIG. 4 is held. Reference numeral 44 denotes a file size of "JobTicket.xml".

Reference numeral 45 denotes a file name of the document file as the second file. As shown in FIG. 4, the file name is "sample.pdf". Reference numeral 46 denotes position information showing in which position in the job file 40 "sample.pdf" is located. The position shown by an arrow from the position information 46 in FIG. 4 is held. Reference numeral 47 denotes a file size of "sample.pdf".

Reference numeral 48 denotes a file name of the image file as the third file. As shown in FIG. 4, the file name is "maruhi.img". Reference numeral 49 denotes position information showing in which position in the job file 40 "maruhi.img" is located. The position shown by an arrow from the position information 49 in FIG. 4 is held. Reference numeral 50 denotes a file size of "maruhi.img".

Reference numeral 51 denotes data of "JobTicket.xml", 52 data of "sample.pdf", and 53 data of "maruhi.img".

Subsequently, contents of the job file shown in FIG. 4 will be specifically explained.

FIG. 5 shows contents of "JobTicket.xml" (51) in FIG. 4.

The job ticket in the embodiment uses a format of a text document using a markup language represented by SGML, XML, or the like. However, an expression of only the portions necessary for explaining the embodiment is used and does not strictly conform to the specification of SGML, XML, or the like.

The job ticket shown in FIG. 5 comprises 42 lines. <JobTicket> of the first line denotes the start of the description of the job ticket. As an expression corresponding to it, </JobTicket> on the 42nd line denotes the end of the description of the job ticket. The 2nd to 41st lines denote specific instructions.

An arbitrary indent can be added to enhance readability of the job ticket itself. A specific print instruction is described as an attribute in the expression of the print instruction.

Three instructions are largely described in the job ticket shown in FIG. 5.

The first instruction is an instruction which starts with <Document and ends with /> shown on the 2nd line and indicates the print target document and the number of output copies. The print target document is "sample.pdf" of an attribute shown by "FileName" and indicates the portion of 52 in FIG. 4. The number of output copies is equal to 10 of an attribute shown by "Amount" and instructs that ten copies are printed.

The second instruction is an instruction which starts with <Media and ends with /> shown on the 3rd line and designates the media which is used for printing. The sheet of the A4 size is designated by an attribute shown by "PaperSize".

The third instruction is an instruction shown on the 4th to 41st lines and indicates how the print target document is arranged and printed on the sheet. The layout instruction starts with <Layout shown on the 4th line and ends with </Layout> on the corresponding 41st line. In "Layout" on the 4th line, there is an attribute "ColorFlag" showing whether a color drawing object is included in this "Layout" or not. In the diagram, an attribute value of "ColorFlag" on the 4th line is true and indicates that the color drawing object is included in this "Layout".

"Sheet" showing one or more media is included in "Layout". Five "Sheets" are included in the job ticket shown in FIG. 5. The first "Sheet" starts with <Sheet on the 5th line and ends with </Sheet on the corresponding 10th line. The second "Sheet" starts with <Sheet on the 11th line and ends with </Sheet on the corresponding 18th line. The third "Sheet" starts with <Sheet on the 19th line and ends with </Sheet on the corresponding 26th line. The fourth "Sheet" starts with <Sheet on the 27th line and ends with </Sheet on the corresponding 32nd line. The fifth "Sheet" starts with <Sheet on the 33rd line and ends with </Sheet on the corresponding 40th line. In each "Sheet", there is a "ColorFlag" attribute showing whether the color drawing object is included in the "Sheet" or not in a manner similar to "Layout". In the diagram, a value of the "ColorFlag" attribute of the first "Sheet" (the 5th line) is false and shows that the color drawing object is not included in this "Sheet". A value of the "ColorFlag" attribute of the second "Sheet" (the 11th line) is true and shows that the color drawing object is included in this "Sheet". A value of the "ColorFlag" attribute of the third "Sheet" (the 19th line) is true and shows that the color drawing object is included in this "Sheet". A value of the "ColorFlag" attribute of the fourth "Sheet" (the 27th line) is false and shows that the color drawing object is not included in this "Sheet". A value of the "ColorFlag" attribute of the fifth "Sheet" (the 33rd line) is true and shows that the color drawing object is included in this "Sheet".

The "ColorFlag" values of the "Sheet" group below "Layout" are reflected to the "ColorFlag" attribute value of "Layout" on the fourth line. It is assumed that when the "Sheet" whose "ColorFlag" attribute value is true exists in the "Sheet" group below "Layout", the "ColorFlag" attribute value of "Layout" is also true. On the contrary, it is assumed that when the "Sheet" whose "ColorFlag" attribute value is true never exists in the "Sheet" group below "Layout", the "ColorFlag" attribute value of "Layout" is also false.

Zero print surface, one print surface, and two print surfaces exist in the respective "Sheets" in a manner similar to the case where one media (sheet) has a front side and a back side. In the embodiment, the print surface is shown by "Surface". In the embodiment, one "Surface" is included in each "Sheet". The "Surface" corresponding to the first "Sheet" starts with <Surface on the 6th line and ends with </Surface> on the corresponding 9th line. The "Surface" corresponding to the second "Sheet" starts with <Surface on the 12th line and ends with </Surface> on the corresponding 17th line. The "Surface" corresponding to the third "Sheet" starts with <Surface on the 20th line and ends with </Surface> on the corresponding 25th line. The "Surface" corresponding to the fourth "Sheet" starts with <Surface on the 28th line and ends with </Surface> on the corresponding 31st line. The "Surface" corresponding to the fifth "Sheet" starts with <Surface on the 34th line and ends with </Surface> on the corresponding 39th line. Each "Surface" has a "Side" attribute showing whether it is the front side or the back side of the "Sheet". The "Side" attribute values of all "Surfaces" in FIG. 5 are "Front" indicative of the front side. Each "Surface" also has the "ColorFlag" attribute showing whether the color drawing object is included in this "Surface" or not in a manner similar to "Layout" and "Sheet". In the diagram, the "ColorFlag" attribute value of the first "Surface" (the 6th line) is false and shows that the color drawing object is not included in this "Surface". The "ColorFlag" attribute value of the second "Surface" (the 12th line) is true and shows that the color drawing object is included in this "Surface". The "ColorFlag" attribute value of the third "Surface" (the 20th line) is true and shows that the color drawing object is included in this "Surface". The "ColorFlag" attribute value of the fourth "Surface" (the 28th line) is false and shows that the color drawing object is not included in this "Surface". The "ColorFlag" attribute value of the fifth "Surface" (the 34th line) is true and shows that the color drawing object is included in this "Surface".

The "ColorFlag" values of the "Surface" group below "Sheet" are reflected to the "ColorFlag" attribute value of each "Sheet". It is assumed that when the "Surface" whose "ColorFlag" attribute value is true exists in the "Surface" group below "Sheet", the "ColorFlag" attribute value of "Sheet" is also true. On the contrary, it is assumed that when the "Surface" whose "ColorFlag" attribute value is true does not exist in the "Surface" group below "Sheet", the "ColorFlag" attribute value of "Sheet" is also false.

Zero or more images or pages are arranged onto one print surface. In the embodiment, the pages which are arranged are shown by "Content". The image can be added to "Content" later and can be used for the purpose of annotating or the like. In the embodiment, the image which is added to "Content" is expressed by "Annotation".

Two "Contents" shown on the 7th and 8th lines are included in the first "Surface". A "Page" attribute, a "Position" attribute, a "Scale" attribute, and a "ColorFlag" attribute are included in the "Content" on the 7th line. It is shown by the "Page" attribute that the 0th page in "sample.pdf" shown by the "FileName" attribute on the second line is arranged. It is shown by the "Position" attribute that the 0th page is arranged in the position of (0, 0) in "Surface". It is shown by the "Scale" attribute that the 0th page is enlarged/reduced to 0.7 time and arranged. It is shown by the "ColorFlag" attribute that the color drawing object is not included in the 0th page. Similarly, the "Content" on the 8th line also shows that the first page is enlarged/reduced to 0.7 time and arranged in the position of (400, 0) and the color drawing object is not included in the first page.

Two "Contents" shown on the 13th to 15th line and the 16th line are included in the second "Surface". The "Content" has attribute values similar to those of the first "Surface". "Annotation" shown on the 14th line is included in the "Contents" shown on the 13th to 15th lines which arrange the second page. "Annotation" on the 14th line has an "ImageFile" attribute, a "Position" attribute, and a "ColorFlag" attribute. It is shown by the "ImageFile" attribute that the image shown by a file "maruhi.img" is added to the "Contents" shown on the 13th to 15th lines. "maruhi.img" shows the portion 53 in FIG. 4. It is shown by the "Position" attribute that "maruhi.img" is arranged in the position of (0, 0) in the "Contents" shown on the 13th to 15th lines. It is shown by the "ColorFlag" attribute that the color drawing object is included in "maruhi.img".

A layout is designated hereinbelow by similar attributes with respect to residual "Content" group and "Annotation" group.

The "ColorFlag" values of the "Content" group and "Annotation" group below "Surface" are reflected to "ColorFlag" attribute value of each "Surface". It is assumed that when the "Content" group and "Annotation" group whose "ColorFlag" attribute values are true exist among the "Content" groups and "Annotation" groups below "Surface", the "ColorFlag" attribute value of "Surface" is also true. On the contrary, it is assumed that when the "Content" group and "Annotation" group whose "ColorFlag" attribute values are true do not exist among the "Content" groups and "Annotation" groups below "Surface", the "ColorFlag" attribute value of "Surface" is also false.

Even if each "ColorFlag" value is true, it is nothing but information showing that the image is handled as a color page, and the color printing is not instructed. The color printing is executed in a color printer and the monochromatic printing is executed in a monochromatic printer irrespective of the attributes shown by "ColorFlag". It is assumed that "ColorFlag" can be set by the job file forming unit 12 or the job file editing unit 13 in FIG. 3.

Figure 6:
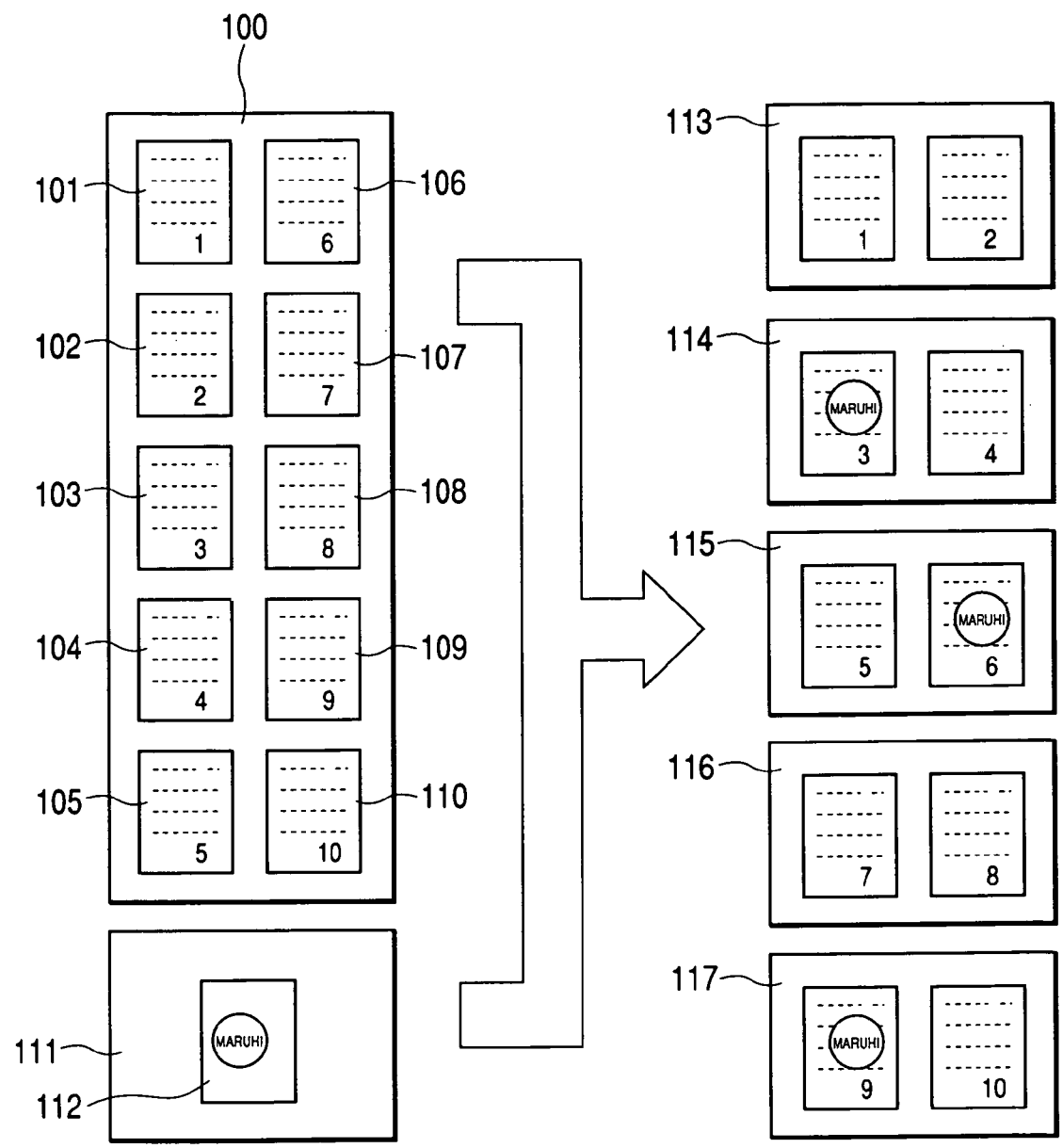
FIG. 6 is an image diagram showing a layout of page data in the first embodiment.

FIG. 6 shows images of the document shown by the contents of "sample.pdf" (52) and "maruhi.img" (53) in FIG. 4 and images obtained as a result of the layout by arranging those images by the job ticket shown in FIG. 5.

In FIG. 6, reference numeral 100 denotes an image of the document shown by the contents of "sample.pdf"; 111 an image of the image shown by the contents of "maruhi.img"; 113 a 0th page obtained after completion of the layout by the job ticket; 114 a 1st page obtained after completion of the layout; 115 a 2nd page obtained after completion of the layout; 116 a 3rd page obtained after completion of the layout; and 117 a 4th page obtained after completion of the layout.

As shown in FIG. 6, "sample.pdf" is a PDF document comprising ten pages. In FIG. 6, reference numeral 101 denotes a 0th page, 102 shows a 1st page, and 103 to 110 similarly indicate 2nd to 9th pages in order hereinbelow. In the embodiment, it is assumed that the number of pages is counted by using "0" as a reference in accordance with an expression of the subsequent job ticket. Therefore, the first page is the 0th page. It is assumed that all "sample.pdf" is constructed by monochromatic data.

In FIG. 6, reference numeral 112 denotes a "maruhi" image written by red characters corresponding to the contents of "maruhi.img".

The color drawing object information of "sample.pdf" and "maruhi.img" can be discriminated by analyzing those data.

"sample.pdf" and "maruhi.img" are arranged onto five sheets as shown at 113 to 117 in accordance with a layout instruction of the job ticket shown in FIG. 5. As shown in the diagram, since the "maruhi" image has been added to each of the sheets 114, 115, and 117, those sheets are the color pages.

Subsequently, what kind of instruction is made to the print server when the job file is transmitted from the print client to the print server in the embodiment will be described.

Figure 8:
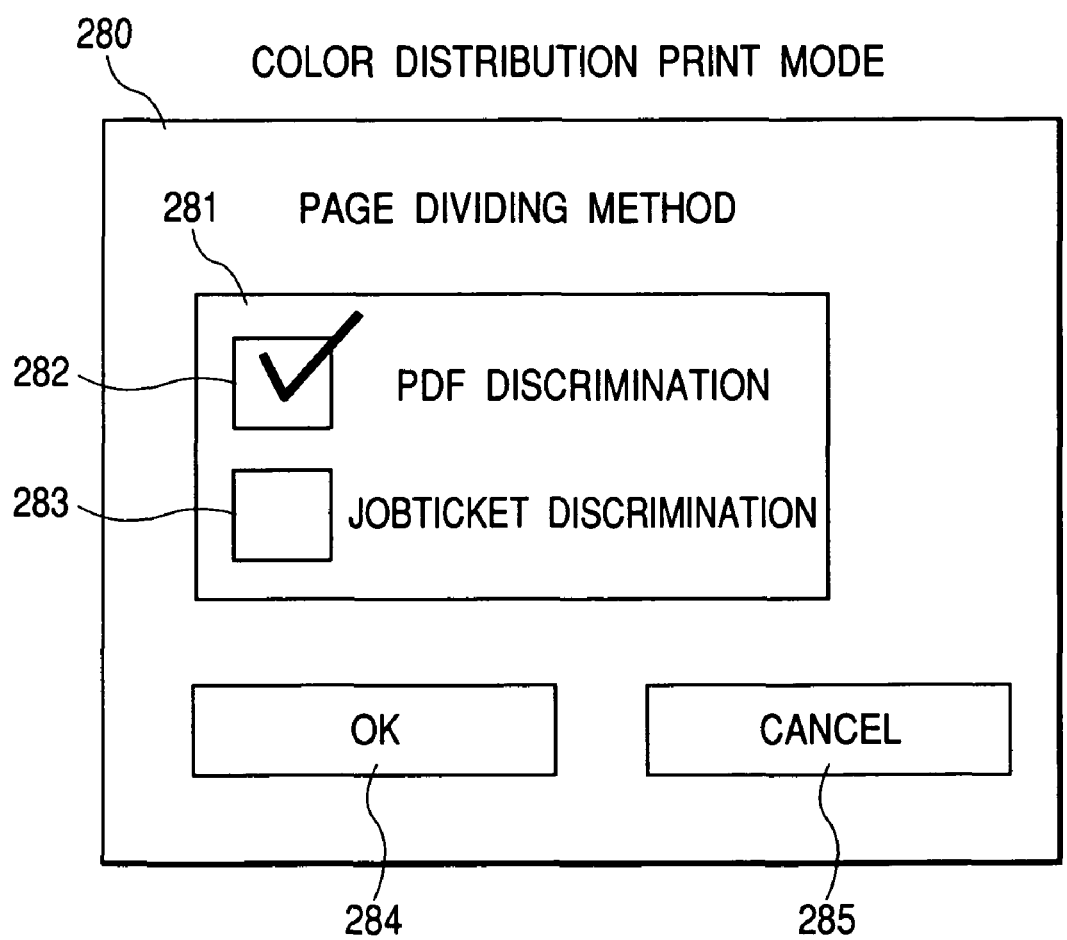
FIG. 8 is a diagram showing an example of a setting display screen in the first embodiment.

FIG. 8 shows an instruction setting display screen which is displayed when the job file is sent from the print client to the print server. This display screen is displayed onto the monitor 2a or 3a in FIG. 1. The user can make a desired instruction by operating the keyboard (2b, 3b) and the mouse (2c, 3c).

According to the print server 1 in FIG. 1, the print page according to the transmitted job file is divided into the monochromatic page and the color page and those pages are distributed to two printers and processed, thereby realizing a higher speed printing process.

FIG. 8 shows an example of the display screen in the case of designating a color distributing method to the print server. In FIG. 8, reference numeral 280 denotes a whole display screen of a color distribution print mode and 281 indicates a window for selecting a method of selecting a device to which the image is distributed. A user interface which can select one of two page dividing methods is provided in the window 281. One of the page dividing methods can be selected by marking a check box by operating the mouse (2c, 3c) or the keyboard (2b, 3b). Reference numerals 282 and 283 denote selection check boxes of the page dividing methods. Reference numeral 282 indicates the method of analyzing contents of a PDF file and selecting a proper page and 283 indicates the method of selecting a proper page in accordance with the contents of the job ticket. FIG. 8 shows a state where the page division based on the PDF discrimination 282 has been selected and the check mark as shown in FIG. 8 is displayed in the position of the check box corresponding to the selected method.

Reference numeral 284 denotes an OK button for instructing to start the color distribution printing in accordance with the set contents and 285 indicates a cancel button for abandoning the set contents and cancelling the printing.

Subsequently, the page division in the color distribution printing will be described.

Figure 7:
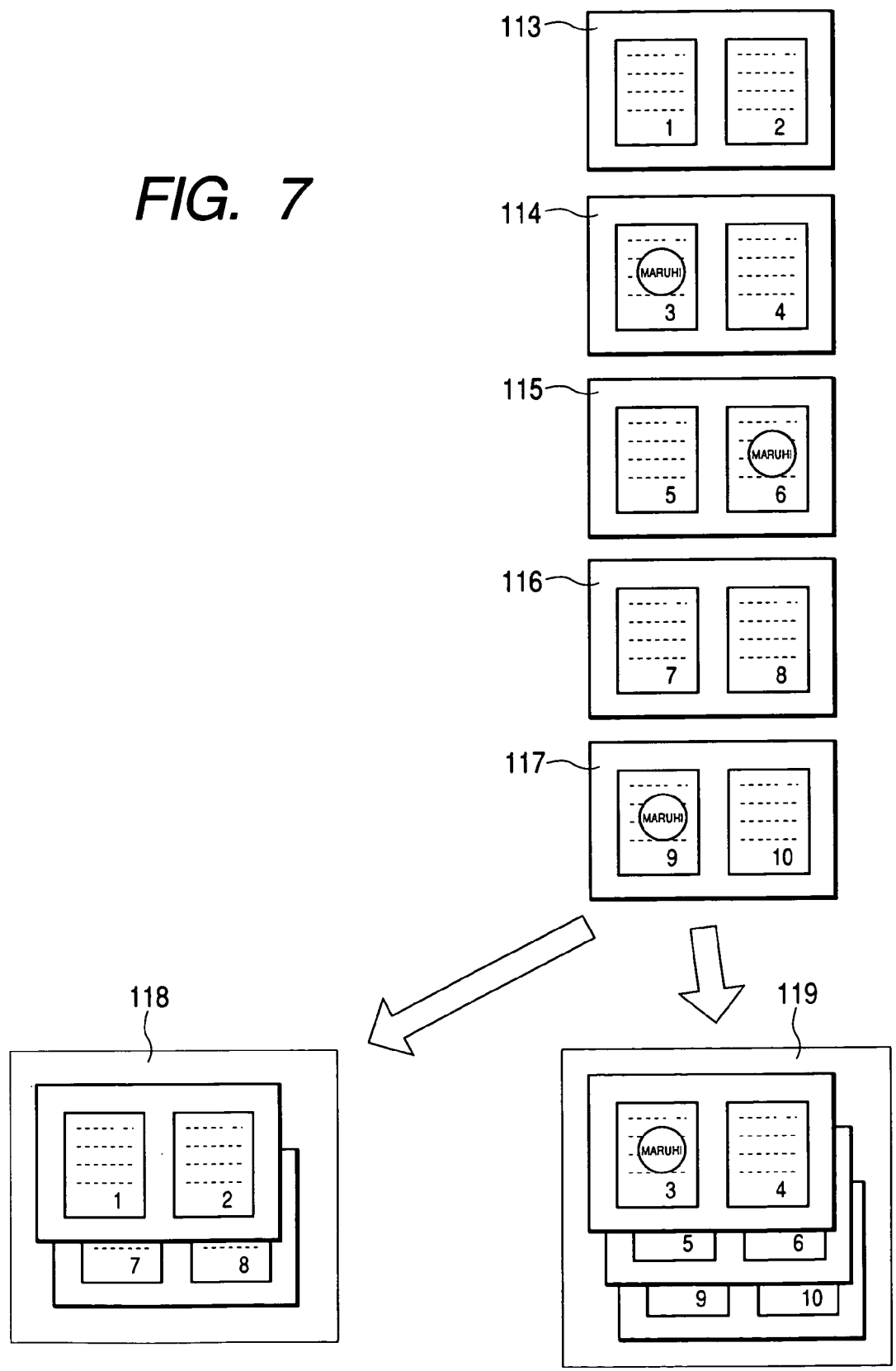
FIG. 7 is an image diagram showing division of the page data in the first embodiment.

FIG. 7 is a diagram showing a page dividing method in the case where the operation has been set so as to divide the job file shown in FIG. 4 into the color page group and the monochromatic page group for distribution to the two devices on the setting display screen shown in FIG. 8. The job file shown in FIG. 4 has print page ranges of five pages as shown at 113 to 117 in FIG. 6. If they are divided into color pages and the monochromatic pages, they are divided into the 0th and 3rd pages and the 1st, 2nd, and 4th pages as shown at 118 and 119 in FIG. 7.

In FIG. 7, reference numeral 118 denotes the ranges of the monochromatic pages and 119 indicates the ranges of the color pages. Further, the same reference numerals are allocated to the pages in each dividing range in correspondence to FIG. 6. In FIG. 7, reference numerals 113 to 117 denote the 0th to 4th pages in a manner similar to those in FIG. 6, respectively.

The suitable devices in the page ranges 118 and 119 are set to the monochromatic printer for 118 and the color printer for 119.

Subsequently, the operation which is executed after the job file shown in FIG. 4 was sent to the print server 1 and the print instruction was made (the button 284 was clicked) on the instruction setting display screen shown in FIG. 8 will be described.

FIGS. 9, 10, 11A and 11B are flowcharts showing a processing procedure of the job file 40 in the print server 1 in the case where the job file 40 shown in FIG. 4 is sent to the print server 1 in the construction shown in FIG. 1 and the printing is performed by the instruction which is made on the setting display screen shown in FIG. 8.

Figure 9:
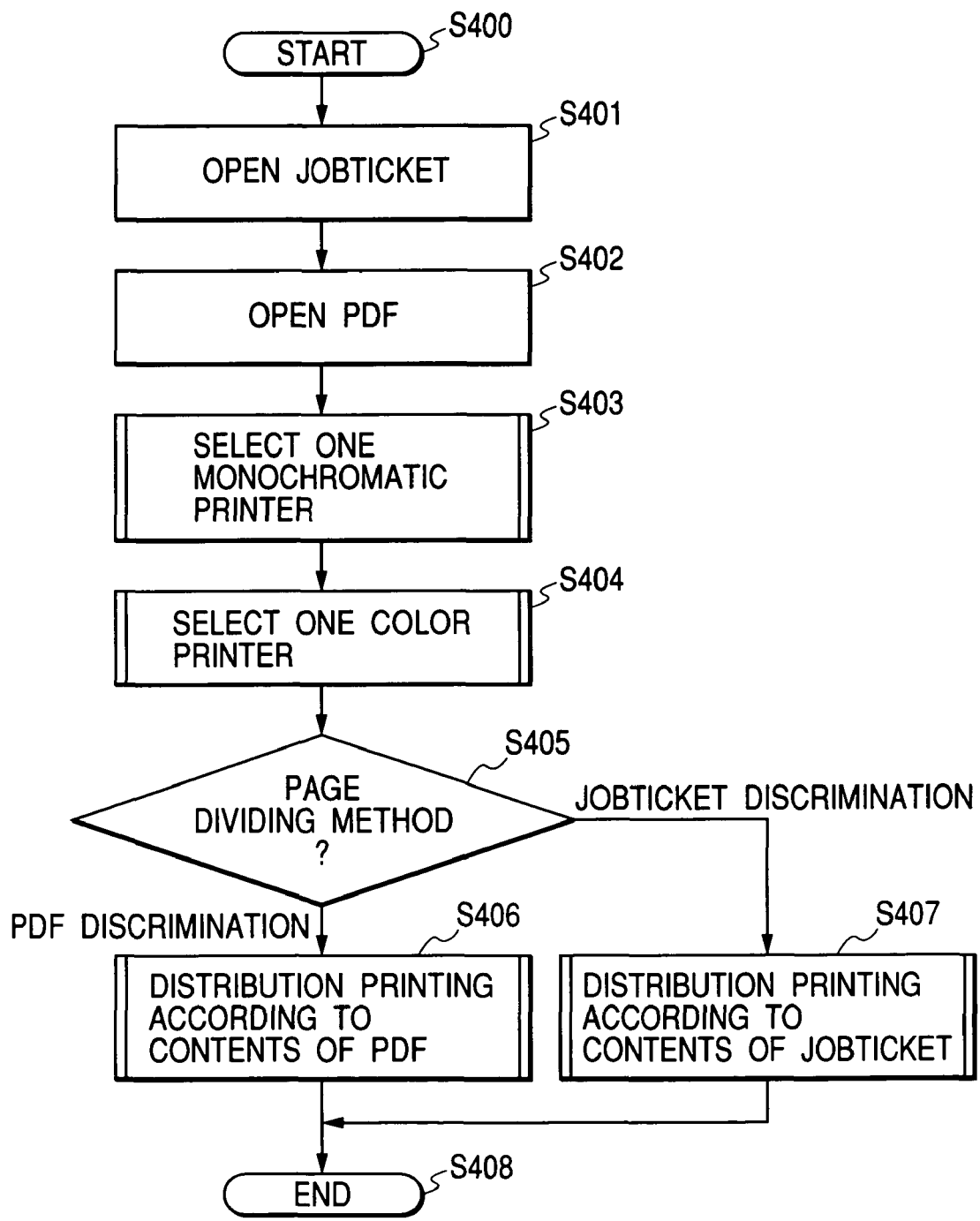
FIG. 9 is a flowchart in the first embodiment.

First, the processing routine is started in step S400 in FIG. 9. It is assumed that the transmission of the job file 40 to the print server 1 has been completed and the instruction on the setting display screen shown in FIG. 8 has also been transmitted at this point of time.

Subsequently, in step S401, the job ticket is opened and the contents of the job ticket are read out. Specifically speaking, the contents are read out from the portion 51 (JobTicket.xml data) in the job file 40.

In step S402, the PDF file is opened. It is assumed that a preparation for analyzing an arbitrary page included in the PDF has been completed from this point of time. Specifically speaking, the contents are read out from the portion 52 (sample.pdf data) in the job file 40.

In step S403, one monochromatic printer for outputting the monochromatic pages is selected. In step S404, one color printer for outputting the color pages is selected.

If the device (printer) which can be selected does not exist, the print server 1 cannot operate. Therefore, in the embodiment, it is presumed as a prerequisite that when the print server 1 is operating, at least one monochromatic printer and one color printer can be selected, respectively.

A discriminating method of dividing the pages into the monochromatic pages and the color pages is discriminated in step S405. It is determined by the instruction sent to the print server 1 in accordance with the contents selected on the setting display screen 281 shown in FIG. 8. In the case of the PDF discrimination 282, step S406 follows. In the case of the "JobTicket" discrimination 283, step S407 follows.

If 282 in FIG. 8 is selected and the print instruction is issued, the distribution printing process according to the contents of the PDF is executed in step S406. If 283 is selected and the print instruction is issued, the distribution printing process according to the contents of the "JobTicket" is executed in step S407. When each of the printing processes is finished, the processing routine is finished in step S408.

The process in step S407 will be described in detail in FIG. 10.

Figure 10:
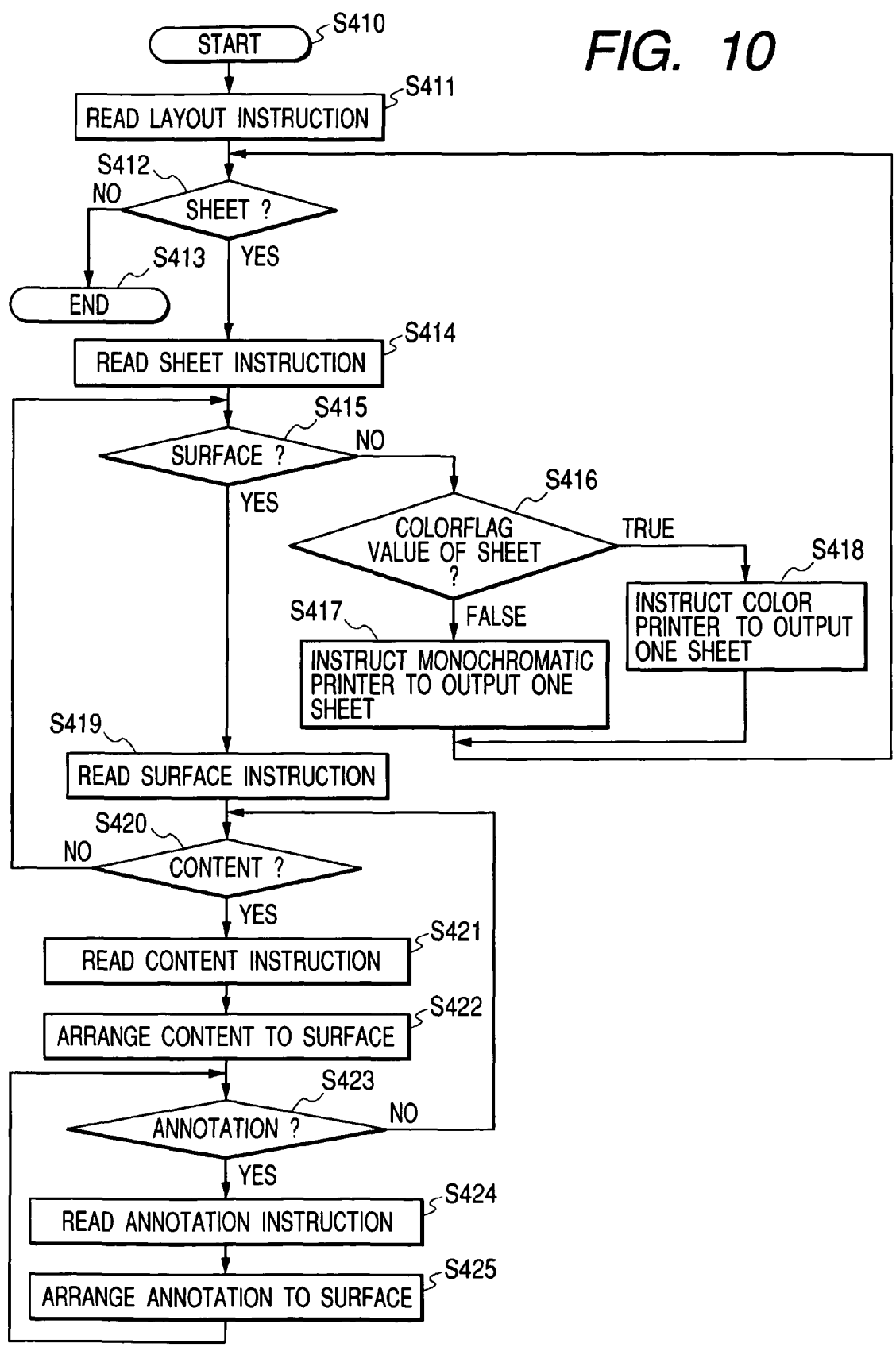
FIG. 10 is a flowchart in the first embodiment.

FIG. 10 is the flowchart for explaining details of step S407 in the flowchart shown in FIG. 9.

The process in step S407 in FIG. 9 is started from step S410 in FIG. 10.

Subsequently, a "Layout" instruction in the job ticket is read out in step S411. In next step S412, whether the "Sheet" description which is not processed yet exists in the read-out "Layout" instruction or not is discriminated. If all "Sheets" have already been processed or if no "Sheet" is included at all (NO), step S413 follows and the processing routine is finished. If the "Sheet" which is not processed yet exists (YES), step S414 follows.

In step S414, a "Sheet" instruction is read out. In next step S415, whether the "Surface" description which is not processed yet exists in the read-out "Sheet" instruction or not is discriminated. If all "Surfaces" in "Sheet" have already been processed (NO), step S416 follows. If the "Surface" which is not processed yet exists (YES), step S419 follows.

A "Surface" instruction is read out in step S419. In next step S420, whether the "Content" description which is not processed yet exists in the read-out "Surface" instruction or not is discriminated. If all "Contents" in "Surface" have already been processed (NO), the processing routine is returned to step S415 in order to process the next "Surface". If the "Content" which is not processed yet exists (YES), step S421 follows.

In step S421, a "Content" instruction is read out. In next step S422, "Content" is arranged into "Surface" in accordance with the contents of the read-out "Content". Specifically, an output image in which the page data of the corresponding PDF has been arranged in the designated position at the designated enlargement/reduction ratio is formed. Since a plurality of "Contents" or "Annotations" can be arranged into one "Surface", internal data is constructed so that "Content"

or "Annotation" which is repetitively arranged is arranged so as to be laid over one "Surface". The internal data constructed here and showing "Surface" is outputted to the printer in step S417 or S418 later.

Subsequently, in step S423, whether the "Annotation" description which is not processed yet exists in the read-out "Content" instruction or not is discriminated. If all "Annotations" in "Content" have already been processed or no "Annotation" is included (NO), the processing routine is returned to step S420 in order to process the next "Content". If the "Annotation" which is not processed yet exists (YES), step S424 follows.

The "Annotation" instruction is read out in step S424. The "Annotation" is arranged into "Surface" in accordance with the content of the read-out "Annotation" in next step S425. Specifically, the contents shown by the "ImageFile" attribute values in the description of "Annotation" are arranged into "Surface" in the designated position and at the designated enlargement/reduction ratio. After completion of the arrangement, the processing routine is returned to step S423 in order to process the next "Annotation".

By repeating the processes in steps S415 to S425 a predetermined number of times, the output data corresponding to one "Sheet" is formed. If all of the "Surfaces" have been processed in step S415, step S416 follows and the output data is outputted to the monochromatic printer or the color printer.

In step S416, whether the output data is outputted to the monochromatic printer or the color printer is discriminated. For this purpose, the "ColorFlag" attribute value in "Sheet" is examined. If the "ColorFlag" attribute value in "Sheet" is true, step S418 follows. If it is false, step S417 follows.

In step S417, the output data is outputted to the monochromatic printer.

In step S418, the output data is outputted to the color printer.

After completion of the output to the printer, the processing routine is returned to step S412 in order to process the next "Sheet".

Subsequently, the process in step S406 will be described in detail with reference to FIGS. 11A and 11B.

Figures 11, 11A:
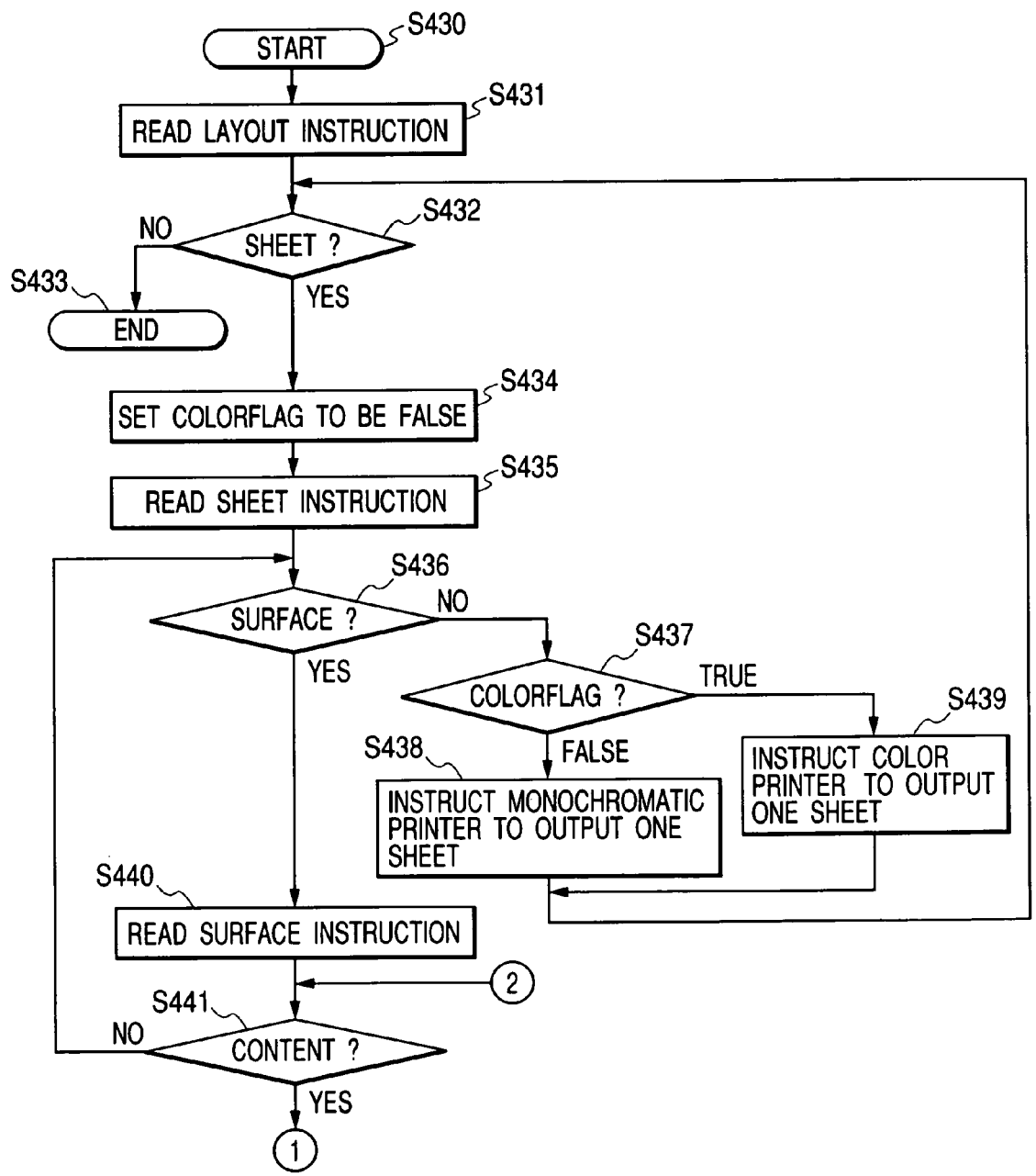
FIG. 11 is comprised of FIGS. 11A and 11B showing flowcharts in the first embodiment.
Figure 11B:
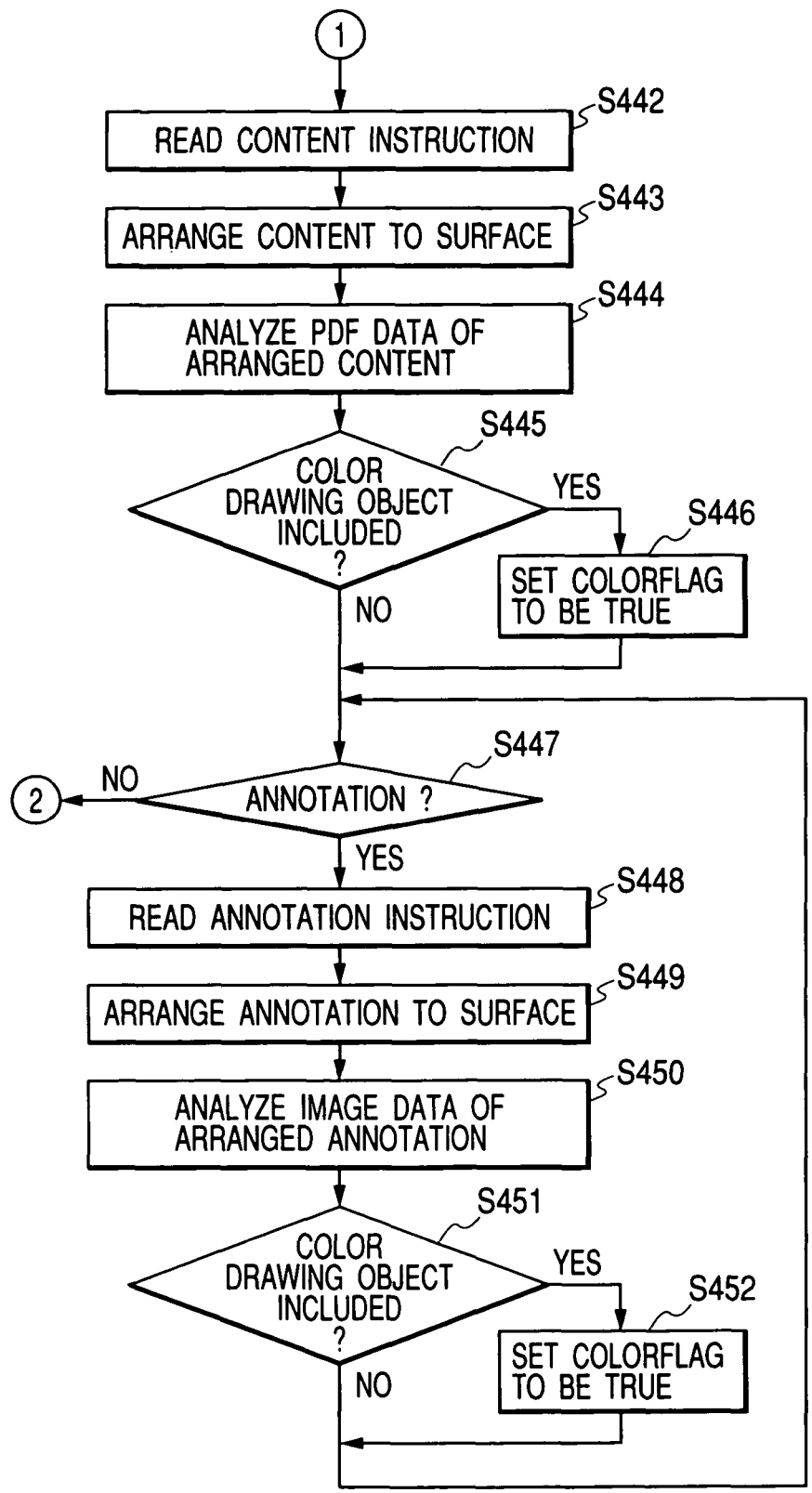

FIGS. 11A and 11B is the flowchart for explaining the details of step S406 in the flowchart shown in FIG. 9.

Step S406 in FIG. 9 is started from step S430 in FIGS. 11A and 11B.

Subsequently, the "Layout" instruction in the job ticket is read out in step S431. In next step S432, whether the "Sheet" description which is not processed yet exists in the read-out "Layout" instruction or not is discriminated. If all "Sheets" have already been processed or if no "Sheet" is included at all (NO), step S433 follows and the processing routine is finished. If the "Sheet" which is not processed yet exists (YES), step S434 follows.

In step S434, an internal variable "colorflag" is initialized to be false.

The "Sheet" instruction is read out in step S435. In next step S436, whether the "Surface" description which is not processed yet exists in the read-out "Sheet" instruction or not is discriminated. If all "Surfaces" in the "Sheet" have already been processed (NO), step S437 follows. If the "Surface" which is not processed yet exists (YES), step S440 follows.

In step S440, the "Surface" instruction is read out. In next step S441, whether the "Content" description which is not processed yet exists in the read-out "Surface" instruction or not is discriminated. If all "Contents" in the "Surface" have already been processed (NO), the processing routine is returned to step S436 in order to process the next "Surface". If the "Content" which is not processed yet exists (YES), step S442 follows.

In step S442, the "Content" instruction is read out. In next step S443, "Content" is arranged into "Surface" in accordance with the contents of the read-out "Content". Whether the color drawing object is included in the PDF data corresponding to the "Content" which has been arranged or not is analyzed in step S444 and its discrimination is made in step S445. In step S445, if the color drawing object is included in the analyzed PDF data (YES), step S446 follows and "ColorFlag" is set to be true. If it is not included (NO), step S447 follows.

Subsequently, in step S447, whether the "Annotation" description which is not processed yet exists in the read-out "Content" instruction or not is discriminated. If all "Annotations" in the "Content" have already been processed or if no "Annotation" is included at all (NO), the processing routine is returned to step S441 in order to process the next "Content". If the "Annotation" which is not processed yet exists (YES), step S448 follows.

In step S448, the "Annotation" instruction is read out. In next step S449, "Annotation" is arranged into "Surface" in accordance with the contents of the read-out "Annotation". Whether the color drawing object is included in the image data corresponding to the "Annotation" which has been arranged or not is analyzed in next step S450 and its discrimination is made in step S451. In step S451, if the color drawing object is included in the analyzed image data (YES), step S452 follows and "ColorFlag" is set to be true. If it is not included (NO), the processing routine is returned as it is to step S447.

By repeating the processes in steps S436 to S452 a predetermined number of times, the output data corresponding to one "Sheet" is formed. Whether the color image is included in the output data or not is set into the internal variable "ColorFlag".

In step S437, whether the output data is outputted to the monochromatic printer or the color printer is discriminated. For this purpose, the value of the internal variable "ColorFlag" is checked. If "ColorFlag" is true, step S439 follows. If it is false, step S438 follows.

In step S438, the output data is outputted to the monochromatic printer.

In step S439, the output data is outputted to the color printer.

After completion of the output to the printer, the processing routine is returned to step S432 in order to process the next "Sheet".

As mentioned above, in the case of the PDF discrimination, the proper output destination printer can be accurately selected in accordance with the information of the drawing data and, in the case of the JobTicket discrimination, the proper output printer can be efficiently selected.

Subsequently, a procedure for properly holding the color information held in "JobTicket" even in the case where the "Layout" instruction described in the job ticket is reconstructed will be described.

FIG. 12 shows the contents of the "JobTicket" in which the layout of the job ticket shown in FIG. 5 is changed from one-side to both-sides. FIG. 12 is constructed by presuming, for example, a case where the layout of the existing job file is changed in the job file editing unit 13 in FIG. 3 and the reprinting is performed, or the like.

Since the contents and structure below each of the five "Surfaces" shown in FIG. 12 are the same as those in the job ticket shown in FIG. 5, the description portion of "Sheet" which was changed by changing the layout from one-side to both-sides will be described.

Three "Sheets" are included in "Layout" shown from the 4th line in FIG. 12. The first "Sheet" corresponds to the 5th to 16th lines, the second "Sheet" corresponds to the 17th to 28th lines, and the third "Sheet" corresponds to the 29th to 36th lines, respectively.

"Surface" of the front side and "Surface" of the back side are included in the first "Sheet". The "Surface" corresponding to the front side of the first "Sheet" in the job ticket shown in FIG. 5 appears on the front side. The "Surface" corresponding to the front side of the second "Sheet" in FIG. 5 appears on the back side. However, the "Side" attribute of the "Surface" (the 10th line) of the back side is "Back". Since the "ColorFlag" attribute value of the "Surface" of the back side is true, the "ColorFlag" attribute value of the first "Sheet" is true.

"Surface" of the front side and "Surface" of the back side are included also in the second "Sheet". The "Surface" corresponding to the front side of the third "Sheet" in the job ticket shown in FIG. 5 appears on the front side. The "Surface" corresponding to the front side of the fourth "Sheet" in FIG. 5 appears on the back side. However, the "Side" attribute of the "Surface" (the 24th line) of the back side is "Back". Since the "ColorFlag" attribute value of the "Surface" of the front side is true, the "ColorFlag" attribute value of the second "Sheet" is true.

Only the "Surface" of the front side is included in the third "Sheet". The "Surface" corresponding to the front side of the fifth "Sheet" in the job ticket shown in FIG. 5 appears on the front side. Since the "ColorFlag" attribute value of the "Surface" of the front side is true, the "ColorFlag" attribute value of the third "Sheet" is true.

Other description is similar to that of the job ticket shown in FIG. 5.

Even if the job ticket is edited and changed so as to perform the duplex printing as shown in FIG. 12, the distribution printing according to the operation display screen shown in FIG. 8 and the flowcharts shown in FIGS. 9 to 10, 11A and 11B can be similarly executed. This is because the color information held in the "JobTicket" has properly been held even in the case of the discrimination according to the contents of the "JobTicket", not to mention the case of the discrimination according to the contents of the PDF.

Subsequently, a method of properly maintaining the color information when the "JobTicket" as shown in FIG. 12 is edited will be described.

Figure 13:
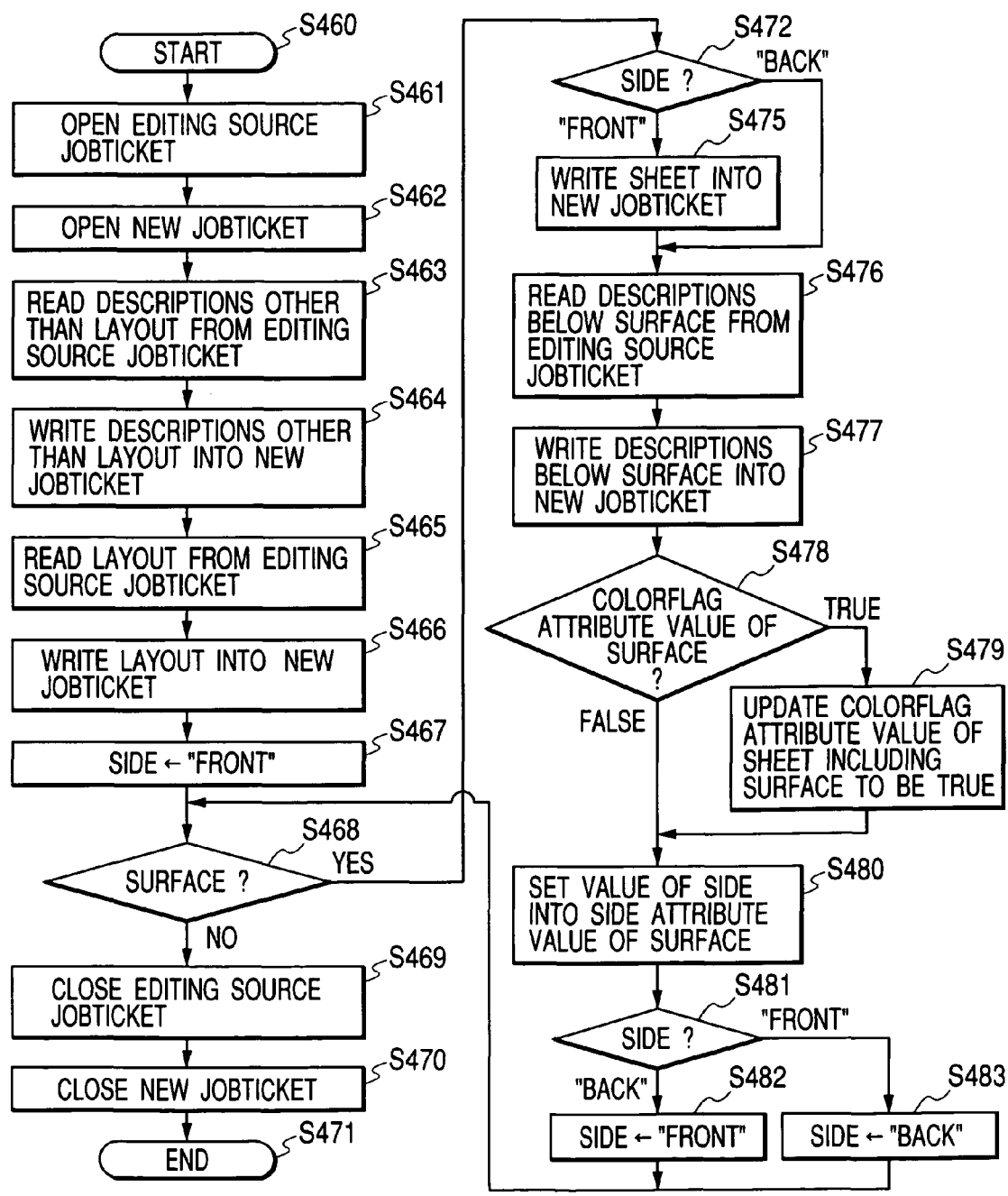
FIG. 13 is a flowchart in the first embodiment.

FIG. 13 is a flowchart showing an example of a procedure for forming the job ticket shown in FIG. 12 from the job ticket shown in FIG. 5. FIG. 13 shows the procedure for sequentially arranging all "Surfaces" for the purpose of duplex printing without changing the structure below each "Surface" of the original job ticket. Thus, the job ticket in FIG. 5 can be reconstructed to the job ticket in FIG. 12 in accordance with the flowchart of FIG. 13.

In FIG. 13, when the processes are started from step S460, the job ticket file on the editing source side corresponding to the job ticket shown in FIG. 5 here is opened for reading in step S461. A new job ticket file corresponding to the job ticket shown in FIG. 12 here is opened for writing in step S462.

First, all descriptions other than "Layout" are read out from the editing source job ticket in step S463. The descriptions of the 1st, 2nd, 3rd, and 42th lines in FIG. 5 are the targets. Those descriptions are written as they are into the new job ticket in next step S464. In FIG. 12, the descriptions of the 1st, 2nd, 3rd, and 38th lines correspond to the contents which are written here.

In next step S465, the portion of the "Layout" description is read out from the editing source job ticket. Although the "Layout" description has a layer structure including a plurality of "Sheets" hereinbelow, since the contents below the "Sheet" are processed by the subsequent processing steps, only the portions corresponding to the 4th and 41st lines in FIG. 5 are set to the targets here. They are written into the new job ticket in step S466. Those portions correspond to the 4th and 37th lines in FIG. 12.

From the next step, the description portions of "Surface" are read out from the editing source job ticket in order from the top. At this time, it is assumed that the description of "Sheet" of the editing source job ticket is ignored. This is because since the contents are changed for the duplex printing in the new job ticket, the description portion of "Sheet" is newly reconstructed, so that there is no need to read out it.

First, an internal variable "side" to hold information indicative of the front side or the back side where "Surface" is arranged is initialized to "Front" in step S467.

Whether the "Surface" which is not processed (not read out) yet exists in the editing source job ticket or not is discriminated in step S468. If the "Surface" which is not processed yet exists (YES), step S472 follows. If all "Surfaces" have been processed (NO), step S469 follows.

In step S469, the editing source job ticket is closed. In step S470, the new job ticket is closed. The processing routine is finished in step S471.

In step S472, whether the "Surface" to be processed from now on is the front side or the back side is discriminated. In the case of the back side ("Back"), step S476 follows. In the case of the front side ("Front"), step S475 follows. In the case of the front side, "Sheet" has to be added to the new job ticket. In step S475, a new "Sheet" is added to "Layout" of the new job ticket. The subsequent "Surface" is added to this "Sheet". The processing routine advances to step S476 in a manner similar to the case of the back side.

In step S476, the next "Surface" is read out from the editing source job ticket. The whole structure including "Content", "Annotation", and the like below the "Surface" is read out by an amount corresponding to one "Surface" here. In next step S477, the contents are additionally written to the new job ticket while the structure in which the "Surface" has been read out is held as it is.

Subsequently, the color information of the "Sheet" to which the "Surface" has been added is updated. In step S478, whether the color drawing object is included or not is discriminated from the "ColorFlag" attribute value of the "Surface" which has just been written. If the color drawing object is included (true), step S479 follows. If the color drawing object is not included (false), step S480 follows. In step S479, since the color drawing object exists in the "Surface" included in the "Sheet", the "ColorFlag" attribute value of the "Sheet" is updated to be true. When the color information of the "Sheet" is updated, the processing routine advances to step S480.

In step S480, a value indicative of the front side or the back side of the added "Surface" is set. In the embodiment, since it is held as a value of the internal variable "side", the value of the internal variable "side" is set into the "Side" attribute value of the "Surface".

If the side which has been set is the front side, the side which is set next becomes the back side and if the side which has been set is the back side, the side which is set next becomes the front side. Therefore, the value of the internal variable "side" is updated. The value of the internal variable "side" is discriminated in step S481. If the value of the internal variable "side" indicates the front side ("Front"), it is set to the back side ("Back") in step S483. If the value indicates the back side ("Back"), it is set to the front side ("Front") in step S482.

The processing routine is returned to step S468 and the next "Surface" is further processed.

Since the color information is also provided for "Surface" as shown in the flowchart shown in FIG. 13, in the editing of the job ticket such as to change the layout from the one-side layout to the both-side layout, the color information necessary for the distribution printing can be properly and easily maintained without newly analyzing the original page data.

By the above procedure, when the job ticket, the document data, and the print instruction are subjected to the color distribution printing process, the pages to be divided can be determined.

As will be understood from the above explanation, the color page information ("ColorFlag" attribute value) described in the job ticket does not instruct the color printing. Further, in the system or method for processing the job file including the job ticket, whether the color page information included in the job ticket is used or not can be selected.

Also when the color page information included in the job ticket is used, since there is no need to newly analyze the page data such as a PDF or the like irrespective of the layout editing of the job ticket, an advantage such that the efficiency is improved by using the color page information included in the job ticket is not lost.

The color page information included in the job ticket is not limited to the result obtained by analyzing the PDF. For example, the job file or hint information at the stage when the PDF is formed can be used as color page information. In this case, although precision deteriorates as color page information, if the color drawing object can be ignored although it is actually included, in the case where the user intentionally wants to instruct the printing using the monochromatic printer or the like, it is also effective to reflect the message showing such a desire to the job ticket. Even in such a case, there is also an advantage such that such a desire can be held as color information into the job ticket without losing the intention of the user in association with the editing of the job ticket.

Although the example of the editing of the job ticket such as a change from the one-side layout to the both-side layout has been shown and described in the embodiment, the invention is not limited to it but the color information can be also similarly and easily maintained also in the case of changing from the both-side layout to the one-side layout.

Second Embodiment

The second embodiment will be described with respect to a difference from the first embodiment.

In the second embodiment, a case of dividing the number of copies and performing the distribution printing instead of dividing the pages and performing the distribution printing is shown.

The second embodiment will be described by partially using the same diagrams as those for the first embodiment.

It is assumed that the whole construction shown in FIG. 1, the flow of the job file shown in FIG. 3, and the constructions of the job files shown in FIGS. 2 and 4 are substantially the same as those in the first embodiment and their detailed description is omitted.

In the first embodiment, the print server 1 performs the color distribution printing in which the pages are divided into the color pages and the monochromatic pages. In the second embodiment, the print server 1 divides a plurality of copies, distributes the divided copies to a plurality of printers, and outputs the print copies, thereby realizing the high-speed print output. At this time, it is important to select the printers suitable for the job file serving as a output target, that is, the color printers or the monochromatic printers.

What kind of instruction is made to the print server when the job file is sent from the print client to the print server in the second embodiment will be described.

Figure 14:
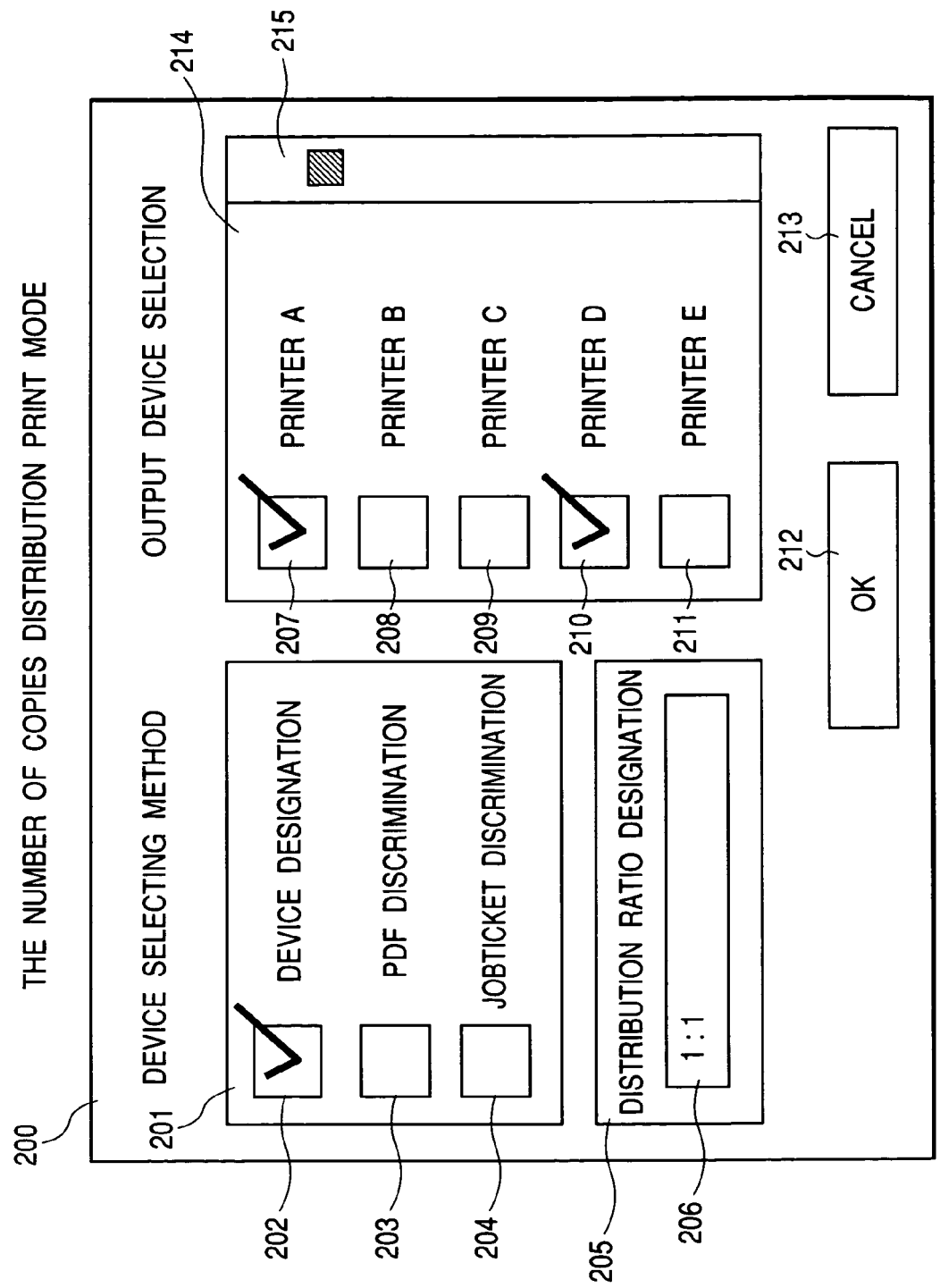
FIG. 14 is a diagram showing an example of a setting display screen in the second embodiment.

FIG. 14 is a diagram showing an instruction setting display screen which is displayed when the job file is transmitted from the print client to the print server. This display screen is displayed onto the monitor 2a or 3a in FIG. 1. The user can make a desired instruction by operating the keyboard (2b, 3b) and the mouse (2c, 3c).

The print server 1 in FIG. 1 divides the number of print copies according to the transmitted job file, distributes the divided copies to a plurality of printers, and processes them, thereby realizing the high-speed process.

FIG. 14 is a diagram showing an example of the display screen by which the distributing method of the copies is designated to the print server. In FIG. 14, reference numeral 200 denotes a whole display screen of the number of copies distribution print mode and 201 indicates a window for selecting the method of selecting the device to which the copies are distributed. A user interface by which one of the three device selecting methods can be selected is provided in the window 201. The user can select one of the three device selecting methods by marking one of check boxes by operating the mouse (2c, 3c) or the keyboard (2b, 3b). Reference numerals 202, 203, and 204 denote selection check boxes corresponding to the device selecting methods, that is, 202 indicates device designation which is made by the user, 203 a method of selecting the proper printer by analyzing the contents of the PDF file, and 204 a method of selecting the proper printer in accordance with the contents of the job ticket. FIG. 14 shows a state where the device designation by the user shown at 202 has been selected. The checkmark as shown in FIG. 14 is displayed in the position of the check box corresponding to the selected method.

Reference numeral 205 denotes a window for setting a distribution ratio, by which the number of devices to which the copies are distributed and a ratio at which the print copies are distributed to those devices are set in an area 206. The setting into the area 206 is made by inputting the ratio by the keyboard (2b, 3b) after the inputting position was selected by the mouse (2c, 3c). In FIG. 14, "1:1" showing that the print copies are uniformly distributed to the two devices has been set. The distribution ratio denotes that by designating a numeral train partitioned by ':' (colon), the print copies are distributed to the devices of the number designated by such a ratio. For example, it is assumed that in the case where the print copies are distributed to three devices, the half number of copies among all of the print copies are distributed to the first device and the residual half number of copies are uniformly distributed to the residual two devices, the ratio "2:1: 1" is designated.

Reference numeral 214 denotes a window for selecting the devices to which the print copies are distributed. When the device designation by the user shown at 202 is selected in the window 201, the valid selection printers are set. Reference numeral 215 denotes a scroll bar for displaying the hidden printers out of the display by using the mouse (2c, 3c) when all printers serving as selection items cannot be fully displayed in the window 214. In FIG. 14, reference numerals 207 to 211 denote check boxes indicative of the printers serving as selection items, respectively. It is assumed that a plurality of printers to which the print copies are distributed are selected among those boxes. In the diagram, a state where the printer A (207) and the printer D (210) have been selected is shown.

Reference numeral 212 denotes an OK button for instructing to start the number of copies distribution printing in accordance with the set contents, and 213 indicates a cancel button for abandoning the set contents and cancelling the printing.

Subsequently, the operation which is executed after the job file shown in FIG. 4 was sent to the print server 1 and the print instruction was made (the OK button 212 was clicked) from the instruction setting display screen shown in FIG. 14 will be described.

Figure 15:
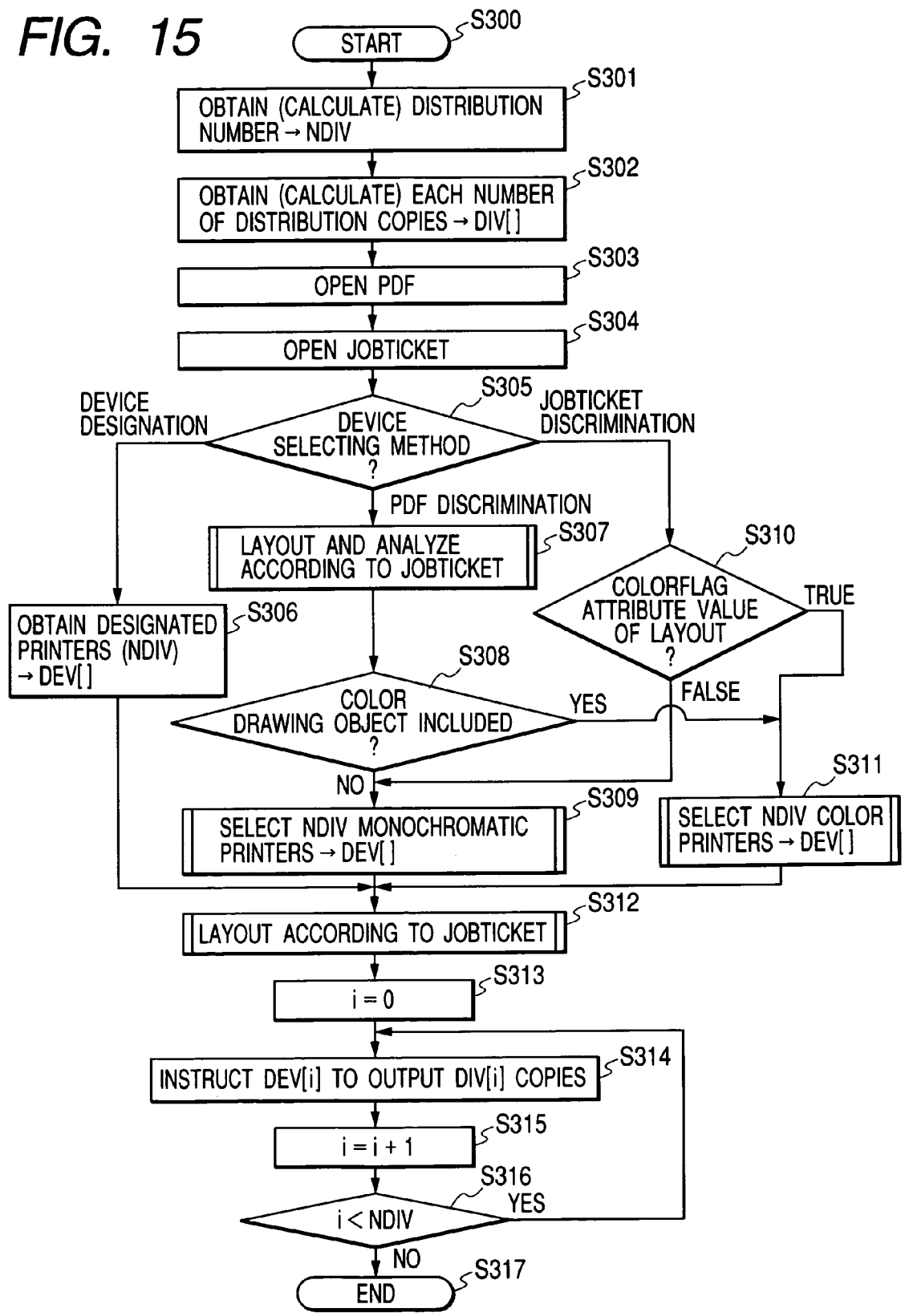
FIG. 15 is a flowchart in the second embodiment.

FIG. 15 is a flowchart showing a processing procedure for the job file 40 shown in FIG. 4 in the print server 1 in the case where the job file 40 is sent to the print server 1 and the printing is performed by an instruction on the setting display screen shown in FIG. 14 in the construction shown in FIG. 1.

First, the processing routine is started in step S300. At this point of time, it is assumed that the transmission of the job file 40 to the print server 1 has been completed and the instruction on the setting display screen shown in FIG. 14 has also been sent. Subsequently, in step S301, the number of devices (printers) to which the print copies are distributed is obtained. Such a value is obtained by counting the number of numerical values of the distribution ratio set in the area 206 in FIG. 14. For example, if the distribution ratio is equal to "1:1" as shown in FIG. 14, the count value is equal to 2 and if it is equal to "2:1:1", the count value is equal to 3. Since such a value is necessary later, it is stored into a variable ndiv for an internal process.

Subsequently, in step S302, each distribution number is calculated and stored into an array variable div[ ] for an internal process. The distribution number is calculated on the basis of the distribution ratio set in the area 206 in FIG. 14 and the total number of print copies in "JobTicket". In the job ticket shown in FIG. 5 corresponding to the job file in FIG. 4, the "Amount" attribute value (10 in FIG. 5) on the second line is distributed at the distribution ratio in the area 206 in FIG. 14. As shown in FIG. 14, if the distribution ratio is equal to "1:1", the print copies are divided into five copies and five copies. If all of the print copies cannot be perfectly divided at an integer ratio due to the designation of the distribution ratio, when the distribution numbers for the respective devices are determined in order, it is assumed that figures below the decimal point are omitted and the residual print copies are added to the distribution number calculation of the next device. For example, if ten print copies are divided at the ratio "1:1:1", ten print copies are divided into (⅓, ⅓, ⅓). However, with respect to the first device, if "10" is divided into ⅓ and the figures below the decimal point are omitted, three copies are distributed. Subsequently, the residual seven copies are distributed at the residual distribution ratio "1:1". Therefore, with respect to the next device, if "7" is divided into ½ and the figures below the decimal point are omitted, three copies are distributed. In this manner, the residual four copies are distributed to the last device. Another example will be mentioned here. If ten print copies are divided at the ratio "1:1:1:1", with respect to the first device, if "10" is divided into ¼ and the figures below the decimal point are omitted, two copies are distributed. Subsequently, if the residual "8" is divided into ⅓, two copies are distributed to the next device. Subsequently, if the residual "6" is divided into ½, three copies are distributed to the third device. Consequently, the residual three copies are distributed to the last device. The numbers of print copies distributed in this manner are stored into arrays div[0], div[1], div[2], each having a suffix based on a reference "0", respectively.

Subsequently, the PDF file is opened in step S303 and the job ticket is opened in step S304.

Subsequently, the method of selecting the devices on the distribution destination side is discriminated in step S305. The device selecting method is determined by an instruction sent to the print server 1 in accordance with the contents selected by the setting display screen of the window 201 shown in FIG. 14. In the case of the device designation by the user shown at 202, the processing routine advances to step S306. In the case of the PDF discrimination 203, step S307 follows. In the case of the job ticket discrimination 204, step S310 follows.

A list of the devices designated by the user in the device selecting window 214 in FIG. 14 is sent as a part of instruction information to the print server 1. In step S306, the devices (printers) on the distribution destination side of the number ndiv are stored in an array dev[ ]. dev[ ] is made to correspond to each number of copies stored in div[ ] hereinlater. If the number of devices designated by the user is larger than the value of ndiv, the devices of the number ndiv from the front among the plurality of designated devices are stored in dev[ ]. If the number of devices designated by the user is smaller than the value of ndiv, the remaining (up to dev[ndiv−1]) of the array is embedded by the device which was finally designated. When the devices on the distribution destination side are determined in step S306, the processing routine advances to step S312.

If the PDF discrimination 203 in FIG. 14 is selected and the print instruction is issued, whether the color drawing object is included in the job which is outputted is included or not is analyzed in step S307. Specifically speaking, a layout to be actually outputted is made from the PDF and the job ticket and whether the color drawing object is included at this time or not is discriminated. A procedure for the layout is assumed to be similar to that in the first embodiment and its detailed description is omitted here. On the basis of a result of such an analysis, whether the color drawing object is included or not is discriminated in next step S308. If the color drawing object is included, since it is necessary to print by the color printers, step S311 follows. If the color drawing object is not included, step S309 follows.

In step S309, the monochromatic printers of the number ndiv are selected and stored into the array dev[ ]. If there are ndiv or more selection candidates of the printers, ndiv printers are simply selected in order from the head printer which can be selected. If the ndiv selection candidates do not exist, the remaining of the array is embedded by the device selected finally. If no selectable device (printer) exists at all, the print server 1 cannot operate. Therefore, in the embodiment, it is presumed that when the print server 1 is operating, at least one monochromatic printer can be selected. If the devices on the distribution destination side are determined in step S309, step S312 follows.

If it is determined in step S308 that the color printing is necessary and the processing routine advances to step S311, the ndiv color printers are selected and stored into the array dev[ ] in step S311. If there are ndiv or more selection candidates of the printers, ndiv printers are simply selected in order from the head printer which can be selected. If the ndiv selection candidates do not exist, the remaining of the array is embedded by the device selected finally. If no selectable device (printer) exists at all, the print server 1 cannot operate. Therefore, in the embodiment, it is presumed that when the print server 1 is operating, at least one color printer can be selected. If the devices on the distribution destination side are determined in step S311, step S312 follows.

If the JobTicket discrimination 204 in FIG. 14 is selected and the print instruction is issued, the "ColorFlag" attribute value is discriminated from the "Layout" description in the job ticket in step S310. If the "ColorFlag" attribute value is true, step S311 follows. If it is false, step S309 follows.

In any of the device selecting methods, when the devices on the distribution destination side are set into the array dev[ ], the processing routine advances to next step S312. In step S312, an output layout is formed from the job ticket and the PDF (including the image for annotation) so that the image can be actually outputted. After that, step S313 follows. The print instruction is sent every number of print copies in accordance with the output destination devices set in the array div[ ] and the number of print copies set in the array dev[ ] from this step.

In step S313, a variable (i) as a count value of a loop counter is initialized first. Subsequently, the output instruction of a div[i] part is issued to a device dev[i] in step S314. The print instruction according to the output layout formed in step S312 is sent to the printer corresponding to dev[i]. When the output instruction is sent, since the device executes the process independently, the print server 1 can shift to the next process. The processing routine advances to next step S315 and the value of (i) is incremented. Further, in step S316, whether the print instruction has been sent to all of the devices or not is discriminated. If (i) is smaller than ndiv (YES), since the devices to which the print instruction is not sent yet exist, the processes are repeated from step S314. If (i) is equal to or larger than ndiv (NO), since the print instruction has been sent to all of the devices, step S317 follows and the distribution printing process is finished.

According to the above procedure, when the print instruction is made to the job file in FIG. 4 by the setting of the display screen shown in FIG. 14, five documents each comprising five pages as shown at 113 to 117 in FIG. 6 are outputted from the printer A and the same five documents are similarly outputted from the printer D. When the check box 203 or 204 is marked, five documents are automatically outputted from each of the selected printers.

Subsequently, a procedure for properly holding the color information held in "JobTicket" even in the case where the layout instruction described in the jot ticket is reconstructed will be described.

FIG. 16 shows contents of the jot ticket in which all annotations of "maruhi" have been removed from the layout of the jot ticket shown in FIG. 5. FIG. 16 is shown by presuming, for example, a case where the layout of the existing job file is changed in the job file editing unit 13 in FIG. 3 and the reprinting is performed, or the like.

In FIG. 16, since the structure of the layer above each of ten "Contents" is substantially the same as that of the job ticket shown in FIG. 5, only the description portion changed by the removal of "Annotations" will be described.

First, the line starting from <Annotation of the description on the 14th line as the first annotation in FIG. 5 is extinguished in FIG. 16. In association with it, the "ColorFlag" attribute value on the 12th line in FIG. 5 as "Surface" including such an annotation has been changed from "true" to "false". In FIG. 16, the 12th line corresponds to the case of "false". Further, the "ColorFlag" attribute value of "Sheet" including such "Surface" has also been changed from "true" to "false". In FIG. 5, the description on the 11th line corresponds to the case of "true". In FIG. 16, the description on the 11th line corresponds to the case of "false".

Subsequently, the line starting from <Annotation of the description on the 23rd line as the second annotation in FIG. 5 is extinguished in FIG. 16. In association with it, the "ColorFlag" attribute value on the 20th line in FIG. 5 as "Surface" including such an annotation has been changed from "true" to "false". In FIG. 16, the 18th line corresponds to the case of "false". Further, the "ColorFlag" attribute value of "Sheet" including such "Surface" has also been changed from "true" to "false". In FIG. 5, the description on the 19th line corresponds to the case of "true". In FIG. 16, the description on the 17th line corresponds to the case of "false".

Similarly, the line starting from <Annotation of the description on the 36th line as the third annotation in FIG. 5 is extinguished in FIG. 16. In association with it, the "ColorFlag" attribute value on the 34th line in FIG. 5 as "Surface" including such an annotation has been changed from "true" to "false". In FIG. 16, the 30th line corresponds to the case of "false". Further, the "ColorFlag" attribute value of "Sheet" including such "Surface" has also been changed from "true" to "false". In FIG. 5, the description on the 33rd line corresponds to the case of "true". In FIG. 16, the description on the 29th line corresponds to the case of "false".

In addition to the above structure, the "ColorFlag" attribute value of "Layout" including "Sheet" whose ColorFlag" attribute value is true in FIG. 5 has also been changed from "true" to "false" in accordance with that the "ColorFlag" attribute value of all "Sheets" are false in FIG. 16.

Figure 17:
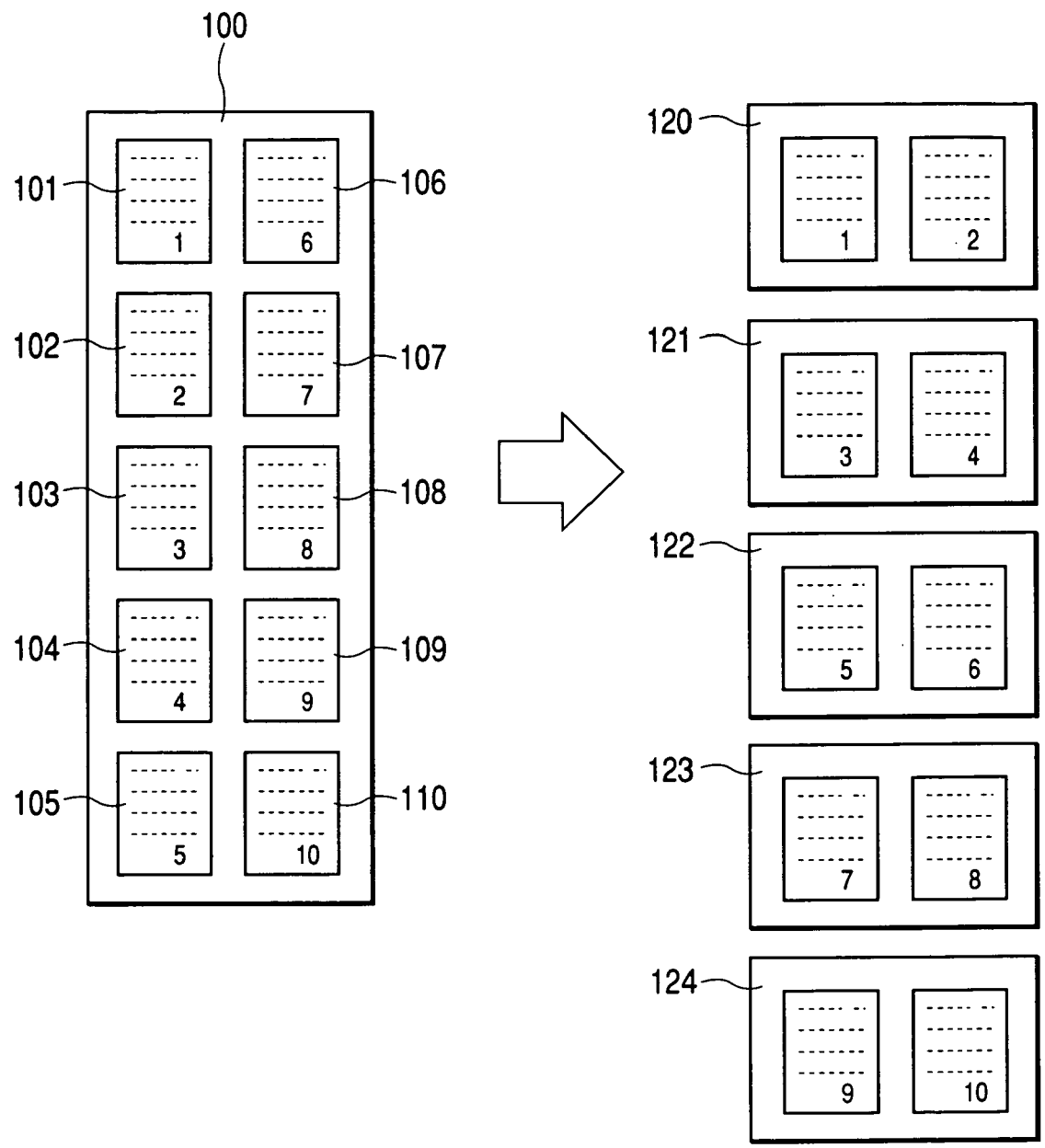
FIG. 17 is an image diagram showing a layout of page data in the second embodiment.

FIG. 17 shows images of documents shown by the contents of "sample.pdf" (52) in FIG. 4 and images as a result obtained by performing the layout of them by the job ticket shown in FIG. 16. Since the annotations have been removed, it will be understood that "maruhi.img" (53) has been extinguished from the layout. In FIG. 17, the pages with respect to "sample.pdf" are the same as those in FIG. 6, they are designated by the same reference numerals. Reference numerals 120 to 124 denote pages obtained by performing the layout by the job ticket shown in FIG. 16.

In FIG. 17, reference numeral 120 denotes the 0th page obtained after the layout was performed by the job ticket; 121 the first page after the layout; 122 the second page after the layout; 123 the third page after the layout; and 124 the fourth page after the layout.

Since no color drawing object is included in "sample.pdf" and the annotation including the color drawing object is not added, all of the pages obtained after the layout shown in FIG. 17 are the monochromatic pages.

Even if the job ticket is edited and changed to the job ticket in which the annotations have been deleted as shown in FIG. 16, the distribution printing according to the operation display screen shown in FIG. 14 and the flowchart shown in FIG. 15 can be similarly executed. This is because the color information held in the "JobTicket" has properly been held even in the case of the discrimination according to the contents of the "JobTicket", not to mention the case of the discrimination according to the contents of the PDF.

Subsequently, a method of properly maintaining the color information when the "JobTicket" as shown in FIG. 16 is edited will be described.

Figure 18:
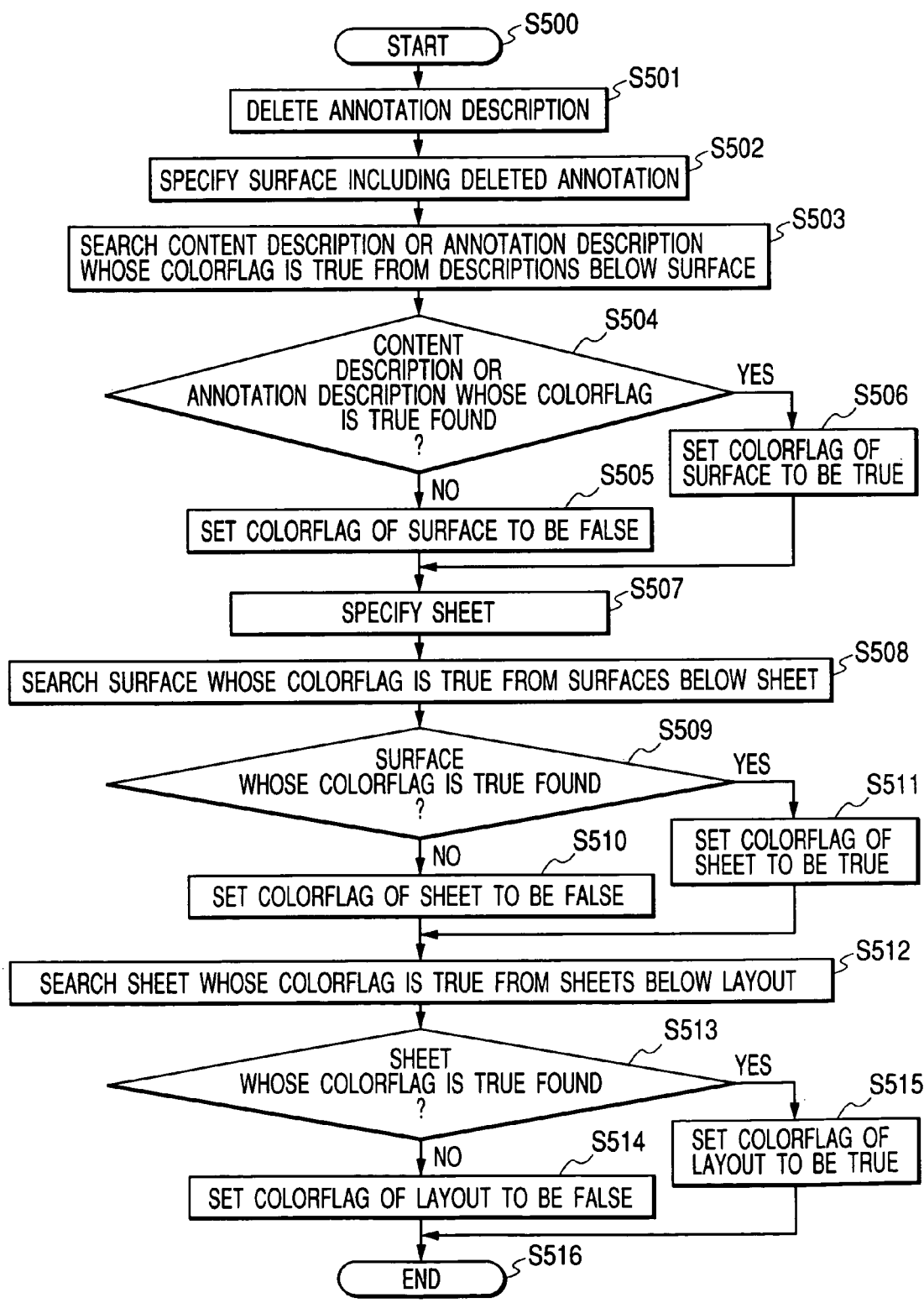
FIG. 18 is a flowchart in the second embodiment.

FIG. 18 is a flowchart showing a procedure for forming the job ticket shown in which the specific annotation has been deleted from the job ticket.

First, the processing routine is started in step S500. It is assumed here that a procedure for directly changing the contents of the job ticket. In the procedure in FIG. 18, it is assumed that the annotation to be deleted, that is, the portion of the description starting from <Annotation has already been able to be specified.

In next step S501, first, the description of the annotation is deleted. For example, in the case of deleting the annotation on the 14th line in FIG. 5, the whole description on the 14th line is first deleted. Since the 13th to 15th lines have been constructed so as to include the description on the 14th line, the portion of the description </Content> on the 15th line is also deleted. At the same time, the end of the description on the 13th line is changed to the description </> instead of >. In this manner, the deletion itself of the annotation is finished. Subsequently, the description is changed so as to properly maintain the color information in the job ticket from step S502.

In step S502, the "Surface" including the annotation deleted in step S501 is specified. In the above example, "Surface" on the 12th line in FIG. 5 corresponds to it. In step S503, the "Content" description or the "Annotation" description whose "ColorFlag" attribute value is true below the. "Surface" is searched.

In step S504, the "Content" description or the "Annotation" description whose "ColorFlag" is true exists or not is discriminated on the basis of a result of step S503. If the "Content" description or the "Annotation" description whose "ColorFlag" attribute value is true exists (YES), step S506 follows. If such "Content" or "Annotation" does not exist (NO), step S505 follows.

In step S505, the "ColorFlag" attribute value of the "Surface" serving as a target at present is set to be false. In step S506, the "ColorFlag" attribute value of the "Surface" serving as a target at present is set to be true. Thus, the color information below "Surface" is properly updated.

Subsequently, the "Sheet" including the "Surface" serving as a target at present is specified in step S507. In step S508, the "Surface" whose "ColorFlag" attribute value is true below the "Sheet" is searched. In this case, since the color information below "Surface" has properly been updated, it is sufficient to examine only the "ColorFlag" attribute value of the "Surface".

In step S509, whether the "Surface" whose "ColorFlag" is true exists or not is discriminated on the basis of a result of step S508. If the "Surface" whose "ColorFlag" attribute value is true is found (YES), step S511 follows. If such "Surface" is not found (NO), step S510 follows.

In step S510, the "ColorFlag" attribute value of the "Sheet" serving as a target at present is set to be false. In step S511, the "ColorFlag" attribute value of the "Sheet" serving as a target at present is set to be true. Thus, the color information below "Sheet" is properly updated.

Subsequently, the "Sheet" whose "ColorFlag" attribute value is true below "Layout" is searched in step S512. In this case, since the color information below "Sheet" has properly been updated, it is sufficient to examine only the "ColorFlag" attribute value of the "Sheet".

In step S513, whether the "Sheet" whose "ColorFlag" attribute value is true exists or not is discriminated on the basis of a result of step S512. If the "Sheet" whose "ColorFlag" attribute value is true is found (YES), step S515 follows. If such "Sheet" does not exist (NO), step S514 follows.

In step S514, the "ColorFlag" attribute value of "Layout" is set to be false. In step S515, the "ColorFlag" attribute value of "Layout" is set to be true. Thus, the color information in the job ticket is properly updated. The processing routine is finished in step S516.

By deleting all annotations in accordance with the flowchart shown in FIG. 18, the job ticket shown in FIG. 16 in which all annotations have been deleted from the job ticket shown in FIG. 5 can be formed.

Since the color information is provided every layer such as "Layout", "Sheet", "Surface", "Content", or "Annotation" like a flowchart shown in FIG. 18, in the editing of the job ticket in which a layout change such as deletion of the annotation or the like is performed, the color information necessary for the distribution printing can be properly and easily maintained without newly analyzing the original page data.

By the above procedure, the proper printers can be determined when the number of copies distribution printing process is executed to the job ticket, document data, and print instruction.

As will be understood from the above description, the color page information ("ColorFlag" attribute value) described in the job ticket does not instruct the color printing. Further, in the system or method for processing the job file including the job ticket, whether the color page information included in the job ticket is used or not can be selected.

Also when the color page information included in the job ticket is used, since there is no need to newly analyze the page data such as a PDF or the like irrespective of the layout editing of the job ticket, the advantage such that the efficiency is improved by using the color page information included in the job ticket is not lost.

Although the example of the job ticket editing such as deletion of the annotation has been shown and described in the embodiment, the invention is not limited to it. Similar processes can be easily performed even in the addition of the annotation, the addition of the pages, or the like.

Third Embodiment

The third embodiment will be described with respect to a difference from the second embodiment.

In the second embodiment, there are three device selecting methods as a method of instructing the print server. According to the method of discriminating the contents of the page data (PDF) among them, even if such a method is not selected and no load is applied as an actual process, means for analyzing the page data is necessary at the time of constructing the system. This causes a problem such that as a computer system, since many resources such as memory area of software, processing ability which is necessary as a prerequisite for the process, and the like are necessary for the target system, final costs rise.

Therefore, in the third embodiment, the print server and the print client are constructed without having the means for selecting the devices by discriminating the contents of the PDF.

Figure 19:
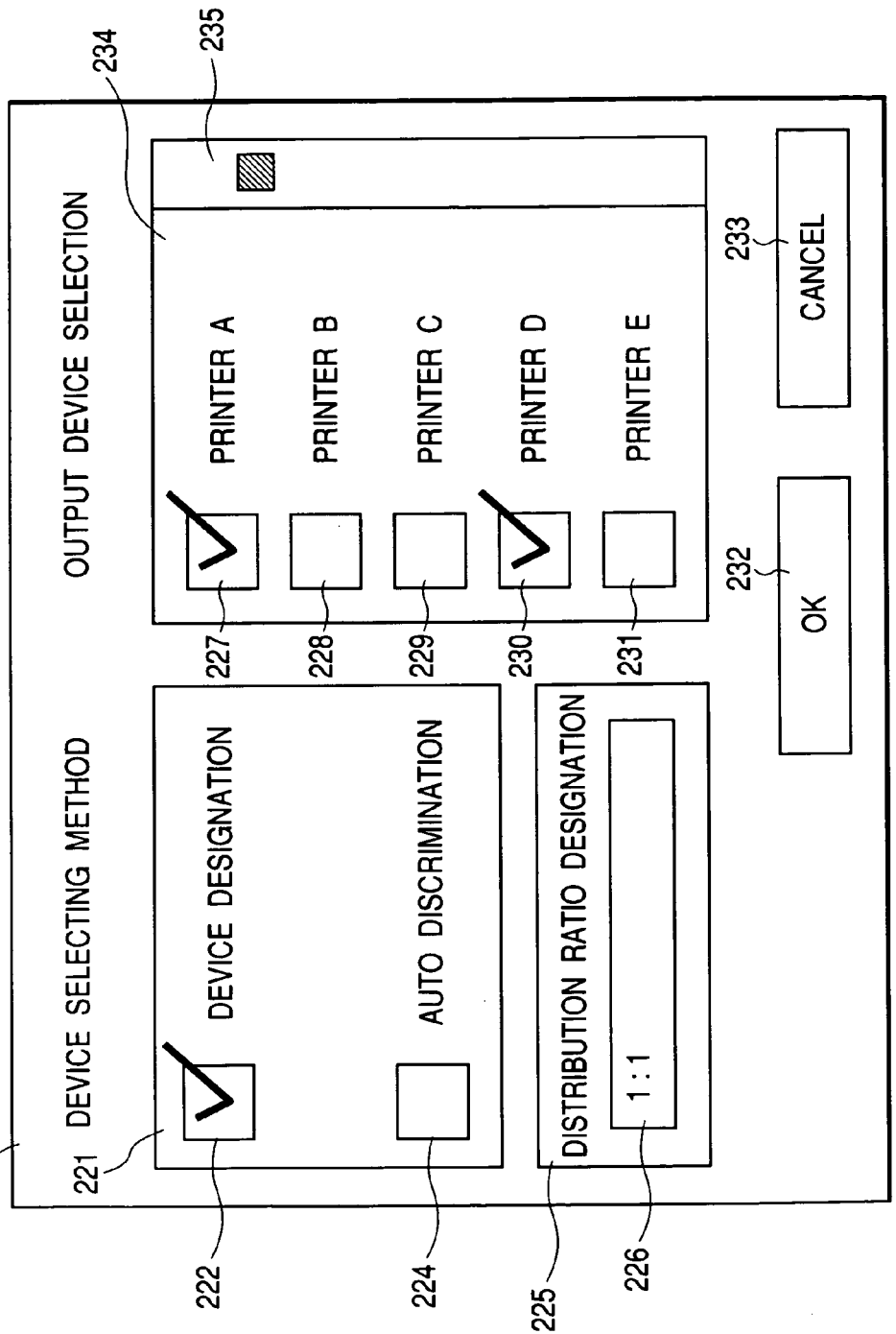
FIG. 19 is a diagram showing an example of a setting display screen in the third embodiment.

FIG. 19 is a diagram showing an example of the display screen for designating the print copy distributing method to the print server in the third embodiment. In FIG. 19, reference numeral 220 denotes a whole display screen of the number of copies distribution print mode and 221 indicates a window for selecting the method of selecting the device to which the copies are distributed. A user interface by which one of the two device selecting methods can be selected is provided in the window 221. The user can select one of the two device selecting methods by marking one of the check boxes by operating the mouse (2*c*, 3*c*) or the keyboard (2*b*, 3*b*). Reference numerals 222 and 224 denote selection check boxes corresponding to the device selecting methods, that is, 222 indicates device designation which is made by the user and 224 indicates automatic selection by the print server. In the automatic selection by the print server, the proper printers are selected in accordance with the contents of the job tickets. FIG. 19 shows a state where the device designation by the user shown at 221 has been selected. The check mark as shown in FIG. 19 is displayed in the position of the check box corresponding to the selected method.

Reference numeral 225 denotes a window for setting a distribution ratio, by which the number of devices to which the copies are distributed and a ratio at which the print copies are distributed to those devices are set in an area 226. The setting into the area 226 is made by inputting the ratio by the keyboard (2*b*, 3*b*) after the inputting position was selected by the mouse (2*c*, 3*c*). In FIG. 19, "1:1" showing that the print copies are uniformly distributed to the two devices has been set. It is assumed that a setting format in this case is the same as that in the first embodiment.

Reference numeral 234 denotes a window for selecting the devices to which the print copies are distributed. When the device designation by the user shown at 222 is selected in the window 221, the valid selection printers are set. Reference numeral 235 denotes a scroll bar for displaying the hidden printers out of the display by using the mouse (2*c*, 3*c*) when all printers serving as selection items cannot be fully displayed in the window 234. In FIG. 19, reference numerals 227 to 231 denote check boxes indicative of the printers serving as selection items, respectively. It is assumed that a plurality of printers to which the print copies are distributed are selected. In the diagram, a state where the printer A (227) and the printer D (230) have been selected is shown.

Reference numeral 232 denotes an OK button for instructing to start the number of copies distribution printing in accordance with the set contents, and 233 indicates a cancel button for abandoning the set contents and cancelling the printing.

As described above, by narrowing down the functions only to the function for automatically selecting the printers by discriminating the color page information included in the job ticket, the system for performing the number of copies distribution printing can be constructed without raising the costs. Also in this case, since the color page information held in the job ticket is not the color print instruction, even in the case of the print instruction by which the user designates the printers, the print pages can be outputted as they are without needing to particularly discriminate the job file. Since the color information has been held every layout layer in the job ticket, the color page can be also properly discriminated to the layout change.

Other Embodiments

Naturally, the object of the invention is also accomplished by a method whereby a recording medium (or a storing medium) in which program codes of software for realizing the functions of the embodiments mentioned above have been recorded is supplied to a system or an apparatus and a computer (or a CPU or an MPU) of the system or the apparatus reads out and executes the program codes stored in the recording medium. In this case, the program codes themselves read out from the recording medium realize the functions of the embodiments mentioned above. The recording medium in which the program codes have been recorded constructs the invention.

Naturally, the invention incorporates not only a case where a computer executes the read-out program codes, so that the functions of the embodiments mentioned above are realized but also a case where an operating system (OS) or the like which is operating on the computer executes a part or all of actual processes on the basis of instructions of the program codes and the functions of the embodiments mentioned above are realized by those processes.

Further, naturally, the invention incorporates not only a case where the program codes read out from the recording medium are written into a memory provided for a function expanding card inserted into a computer or a function expanding unit connected to a computer and, thereafter, a CPU or the like provided for the function expanding card or the function expanding unit executes a part or all of actual processes on the basis of instructions of the program codes and the functions of the embodiments mentioned above are realized by those processes.

In the case of applying the invention to the recording medium, the program codes corresponding to the flowcharts described above are stored into the recording medium.

As described above, according to the embodiments, in the distribution printing, when the optimum output devices (printers) are automatically selected or the proper pages are selected in accordance with output destinations, by selecting them on the basis of the color information held every layer of the layout structure of the job ticket, the conventional processes which have been executed by analyzing the page data and which applies a load can be efficiently executed at low costs.

Further, since the color information is held every layer of the layout structure, even in the reprinting such that the job ticket is edited and the layout is finely adjusted, there is no need to analyze the page data again in order to update the color information. Therefore, the job ticket can be also edited without losing the advantage which is provided by holding the color information into the job ticket.

Since the color information held in the job ticket is reference information which is used in accordance with the process of the print system, the generality of the job (file) as an object of the job ticket is not lost. Therefore, in the case where the color printing is not performed or in the system which does not make the selection of the devices or the discrimination of the page in the distribution printing, even if the same job ticket is processed, no problem is caused in the compatibility of the format and contents of the job ticket.

When precision of the color information which is held in the job ticket is lower than that of the result obtained by analyzing the real page data, on the operation to the print system, by enabling either the analysis of the page data or the color information which is held in the job ticket to be selected, the operation which meets the requirement of the user more can be realized.

If the user rather wants to classify the monochromatic pages and the color pages in accordance with a desired layer other than the analysis result of the real page data, the operation that is further optimum to the requirement of the user can be realized by actively using the information of the job ticket. For example, the case where when a color drawing portion in a certain page is very small, the user has recognized that there is no need to take the trouble to perform the color printing of such a page or the like corresponds to such a situation.

Also with respect to such a point, since the color information held in the job ticket can be effectively edited again, a possibility that such an intention of the user as mentioned above is deleted as a result of the editing of the job ticket is also reduced.

Although the text data using the markup language has been shown as an example of the job ticket in the embodiments, the invention is not limited to it but it can be effectively applied to any format so long as partial ranges of an instruction of a predetermined output format and an apparatus control instruction can be designated and description of other conditions can be made.

Although the system using the PDF as page data has been shown as an example of the print management system, the invention is not limited to it but it can be also effectively applied to a case of a system using another format or a plurality of formats.

What is claimed is:

1. An information processing apparatus comprising:
a generating unit configured to generate a job ticket for one-side printing, wherein, in the job ticket, a plurality of sheets are set to have respective color attributes;
a selecting unit configured to select a job ticket discrimination mode or an image data discrimination mode for color attribute determination;
a first analyzing unit configured to analyze a color attribute of image data arranged on a first sheet of the plurality of sheets;
a second analyzing unit configured to analyze a color attribute of an annotation arranged on the first sheet;
a third analyzing unit configured to analyze a color attribute described in the job ticket for the first sheet, without analyzing the color attribute of the image data arranged on the first sheet; and
a determining unit configured to determine the color attribute of the first sheet based on analysis results obtained by the first and second analyzing units, if the selecting unit selects the image data discrimination mode, and determine the color attribute of the first sheet based on an analysis result obtained by the third analyzing unit, if the selecting unit selects the job ticket discrimination mode.

2. The apparatus according to claim 1, further comprising a transmission control unit configured to transmit one of the plurality of sheets whose color attribute is for color printing to a color printer and another of the plurality of sheets whose color attribute is for monochromatic printing to a monochromatic printer.

3. A control method carried out in an information processing apparatus, the method comprising:
generating a job ticket for one-side printing, wherein, in the job ticket, a plurality of sheets are set to have respective color attributes and a first sheet of the plurality of sheets is set to have a color attribute determined based on a color attribute;
selecting a job ticket discrimination mode or an image data discrimination mode for color attribute determination;
a first analyzing step of analyzing a color attribute of image data arranged on a first sheet of the plurality of sheets;
a second analyzing step of analyzing a color attribute of an annotation arranged on the first sheet;
a third analyzing step of analyzing a color attribute described in the job ticket for the first sheet, without analyzing the color attribute of the image data arranged on the first sheet; and
a determining step of determining the color attribute of the first sheet based on analysis results obtained by the first and second analyzing steps, if the selecting step selects the image data discrimination mode, and determining the color attribute of the first sheet based on an analysis result obtained by the third analyzing step, if the selecting step selects the job ticket discrimination mode.

4. The method according to claim 3, further comprising transmitting one of the plurality of sheets whose color attribute is for color printing to a color printer and another of the plurality of sheets whose color attribute is for monochromatic printing to a monochromatic printer.

5. A non-transitory computer-readable storage medium for storing a program that causes a computer to execute the method according to claim 3.

* * * * *